US011888221B2

(12) United States Patent
Gienger et al.

(10) Patent No.: US 11,888,221 B2
(45) Date of Patent: Jan. 30, 2024

(54) THROUGH-HOLE ANTENNA MOUNTS AND ASSEMBLIES

(71) Applicant: CommScope Technologies LLC, Hickory, NC (US)

(72) Inventors: Ulrich Albert Gienger, Fairview, TX (US); Jignesh Patel, Plano, TX (US); Julian R. Colapietro, McKinney, TX (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/823,339

(22) Filed: Aug. 30, 2022

(65) Prior Publication Data

US 2022/0416411 A1 Dec. 29, 2022

Related U.S. Application Data

(62) Division of application No. 17/197,729, filed on Mar. 10, 2021, now Pat. No. 11,456,528.

(60) Provisional application No. 63/050,249, filed on Jul. 10, 2020, provisional application No. 63/012,967, filed on Apr. 21, 2020.

(51) Int. Cl.
*H01Q 1/44* (2006.01)
*H01Q 1/12* (2006.01)

(52) U.S. Cl.
CPC ................. *H01Q 1/44* (2013.01); *H01Q 1/12* (2013.01)

(58) Field of Classification Search
CPC ........ H01Q 1/12; H01Q 1/1242; H01Q 1/246; H01Q 1/44
See application file for complete search history.

(56) References Cited

U.S. PATENT DOCUMENTS

| | | | | |
|---|---|---|---|---|
| 5,641,141 | A * | 6/1997 | Goodwin | H01Q 1/12 343/879 |
| 10,199,712 | B1 * | 2/2019 | Boyle | F21S 8/085 |
| 10,347,979 | B1 * | 7/2019 | Boyle | H01Q 1/1228 |
| 11,456,528 | B2 * | 9/2022 | Gienger | H01Q 1/1242 |
| 2010/0026604 | A1 * | 2/2010 | Caldwell | H01Q 1/1242 343/890 |

(Continued)

FOREIGN PATENT DOCUMENTS

| | | |
|---|---|---|
| CN | 202050047 U | 11/2011 |
| CN | 202423537 U | 9/2012 |
| CN | 205069845 U | 3/2016 |

OTHER PUBLICATIONS

"International Search Report and Written Opinion corresponding to International Application No. PCT/US2021/021681 dated Jun. 29, 2021".

(Continued)

*Primary Examiner* — Jason Crawford
(74) *Attorney, Agent, or Firm* — Myers Bigel, P.A.

(57) ABSTRACT

A monopole-streetlight assembly includes: an elongate monopole having lower and upper ends; a module configured for mounting of telecommunications antennas; the module including an upper plate and a central spine having an upper end that extends above the upper plate; an adapter having a lower sleeve that receives the upper end of the spine and a flange that extends radially outwardly from the sleeve; and a luminaire unit having an arm having a base, the base being secured to the adapter flange, and further having a luminaire mounted opposite the base.

5 Claims, 17 Drawing Sheets

(56) References Cited

U.S. PATENT DOCUMENTS

| | | | | |
|---|---|---|---|---|
| 2011/0085322 | A1* | 4/2011 | Myer | H01L 31/0521 362/183 |
| 2011/0156984 | A1* | 6/2011 | Caldwell | H01Q 1/1207 343/890 |
| 2015/0013261 | A1* | 1/2015 | Kolokotronis | B23P 15/00 52/651.07 |
| 2016/0211574 | A1* | 7/2016 | Dundorf | H01Q 1/44 |
| 2016/0336641 | A1* | 11/2016 | DiPiero | H01Q 1/1242 |
| 2017/0279187 | A1* | 9/2017 | Lockwood | H01Q 1/42 |
| 2017/0324154 | A1 | 11/2017 | Hendrix et al. | |
| 2018/0254545 | A1* | 9/2018 | Hendrix | H01Q 1/02 |
| 2018/0277921 | A1* | 9/2018 | Ming | H01Q 1/1242 |
| 2019/0277050 | A1* | 9/2019 | Lockwood | H01Q 1/1242 |
| 2020/0136236 | A1* | 4/2020 | Colapietro | H01Q 21/0025 |
| 2020/0388902 | A1* | 12/2020 | Colapietro | H01Q 1/1242 |
| 2020/0411945 | A1 | 12/2020 | Heath et al. | |
| 2021/0131629 | A1* | 5/2021 | Bembridge | H01Q 1/42 |
| 2021/0215307 | A1* | 7/2021 | De Goederen-Oei | E04H 12/085 |
| 2021/0320393 | A1* | 10/2021 | Williams | H01Q 1/22 |
| 2021/0328337 | A1* | 10/2021 | Gienger | H01Q 1/44 |
| 2021/0396365 | A1* | 12/2021 | Friederichs | H02G 3/0406 |
| 2021/0408664 | A1* | 12/2021 | Severin | H01Q 1/20 |
| 2022/0090749 | A1* | 3/2022 | Pretorius | F21V 23/008 |
| 2022/0223993 | A1* | 7/2022 | Gienger | F21V 23/02 |
| 2022/0285826 | A1* | 9/2022 | Ruiz | H01Q 1/1242 |
| 2022/0311122 | A1* | 9/2022 | Patel | H01Q 1/24 |
| 2022/0416411 | A1* | 12/2022 | Gienger | H01Q 1/44 |

OTHER PUBLICATIONS

"International Preliminary Report on Patentability corresponding to International Application No. PCT/US2021/021681 dated Nov. 3, 2022".

* cited by examiner

THROUGH-HOLE ANTENNA MOUNTS AND ASSEMBLIES

RELATED APPLICATIONS

The present application is a divisional of and claims priority to U.S. patent application Ser. No. 17/197,729, filed Mar. 10, 2021, which claims priority from and the benefit of U.S. Provisional Patent Application Nos. 63/012,967, filed Apr. 21, 2020, and 63/050,249, filed Jul. 10, 2020, each of which is hereby incorporated by reference herein in full.

FIELD

The present application is directed generally toward communication antennas, and more particularly to mounting structures for communications antennas.

BACKGROUND

As wireless data service demands have grown, a conventional response has been to increase the number and capacity of conventional cellular Base Stations (Macro-Cells). The antennas used by such Macro-Cells are typically mounted on antenna towers. A conventional antenna tower has three or four legs on which antennas and supporting remote radio units (RRUs) are mounted. However, in some environments structures known as "monopoles" are used as mounting structures. Monopoles are typically employed when fewer antennas/RRUs are to be mounted, and/or when a structure of less height is required.

In addition, Macro-Cell sites are becoming less available, and available spectrum limits how much additional capacity can be derived from a given Macro-Cell. Accordingly, small cell RRU and antenna combinations have been developed to "fill in" underserved or congested areas that would otherwise be within a Macro-Cell site. Deployment of small cells, particularly in urban environments, is expected to continue to grow. Often such small cell configurations (sometimes termed "metrocells") are mounted on monopoles. Typically, these small cell configurations do not permit mounting of other equipment above the antenna.

In some instances, metrocells may be mounted on existing structures, such as buildings, billboards, kiosks, and the like. See, e.g., U.S. Patent Publication Nos. 2017/0324154 and 2020/0411945, each of which is hereby incorporated herein by reference in full. In view of the foregoing, it may be desirable to provide additional monopole arrangements.

SUMMARY

A first aspect of the present invention is directed to a monopole-streetlight assembly. The assembly may include an elongate monopole having lower and upper ends, a module configured for mounting of telecommunications antennas; the module including an upper plate and a central spine having an upper end that extends above the upper plate, an adapter having a lower sleeve that receives the upper end of the spine and a flange that extends radially outwardly from the sleeve, and a luminaire unit having an arm having a base, the base being secured to the adapter flange, and further having a luminaire mounted opposite the base.

Another aspect of the present invention is directed to a monopole-streetlight assembly. The assembly may include an elongate monopole having lower and upper ends, a module configured for mounting of telecommunications antennas; the module including an upper plate and a central spine having an upper end that extends above the upper plate, an adapter having a lower sleeve that receives the upper end of the spine and a flange that extends radially outwardly from the sleeve, the flange having a plurality of mounting holes, a luminaire unit having an arm having a base, the base being secured to the adapter flange via the mounting holes, and further having a luminaire mounted opposite the base, and at least one power cable routed through the spine and the sleeve into the luminaire arm to provide power to the luminaire.

Another aspect of the present invention is directed to an assembly. The assembly may include a module configured for mounting of telecommunications antennas, the module including an upper plate and a central spine having an upper end that extends above the upper plate, and an adapter having a lower sleeve that receives the upper end of the spine and a flange that extends radially outwardly from the sleeve, the flange including a plurality of mounting holes.

Another aspect of the present invention is directed to an antenna mount assembly. The assembly may include an antenna module configured for mounting an antenna having a center through-hole and a removable adapter. The antenna module includes a pole top mount plate and a central spine coupled to the pole top mount plate that extends upwardly therefrom. The removable adapter is configured to be secured to an upper end of the central spine and may include a first clamp member including a first partial tubular section and a top plate that extends radially outwardly from the first partial tubular section, the top plate including a plurality of mounting holes, and a second clamp member including a second partial tubular section and a flange, wherein the flange is configured to be secured to the top plate. The first and second partial tubular sections are configured to engage the upper end of the spine to secure the removable adapter to the antenna module.

Another aspect of the present invention is directed to an antenna mount assembly. The assembly may include an antenna module configured for mounting an antenna having a center through-hole and a removable adapter. The antenna module includes a pole top mount plate and a central spine coupled to the pole top mount plate and extending upwardly therefrom. The removable adapter is configured to be secured to an upper end of the central spine and may include a first clamp member including a first partial tubular section and a top plate that extends radially outwardly from the first partial tubular section, the top plate including a plurality of mounting holes, a second clamp member including a second partial tubular section and a flange, wherein the flange is configured to be secured to the top plate by a fastener, and a locking mechanism configured to draw the first and second clamp members together to secure the clamp members to the central spine of the antenna module.

Another aspect of the present invention is directed to an antenna mount assembly. The assembly may include an antenna module configured for mounting an antenna having a center through-hole and a removable adapter. The antenna module includes a pole top mount plate and a central spine coupled to the pole top mount plate and extending upwardly therefrom. The removable adapter is configured to be secured to an upper end of the central spine and may include a first clamp member including a first clamp section and a top plate that extends radially outwardly from the first clamp section, the top plate including a plurality of mounting holes, and a second clamp member including a second clamp section configured to be secured to the top plate. The first and second clamp sections have corresponding recesses configured to engage the upper end of the spine to secure the removable adapter to the antenna module.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
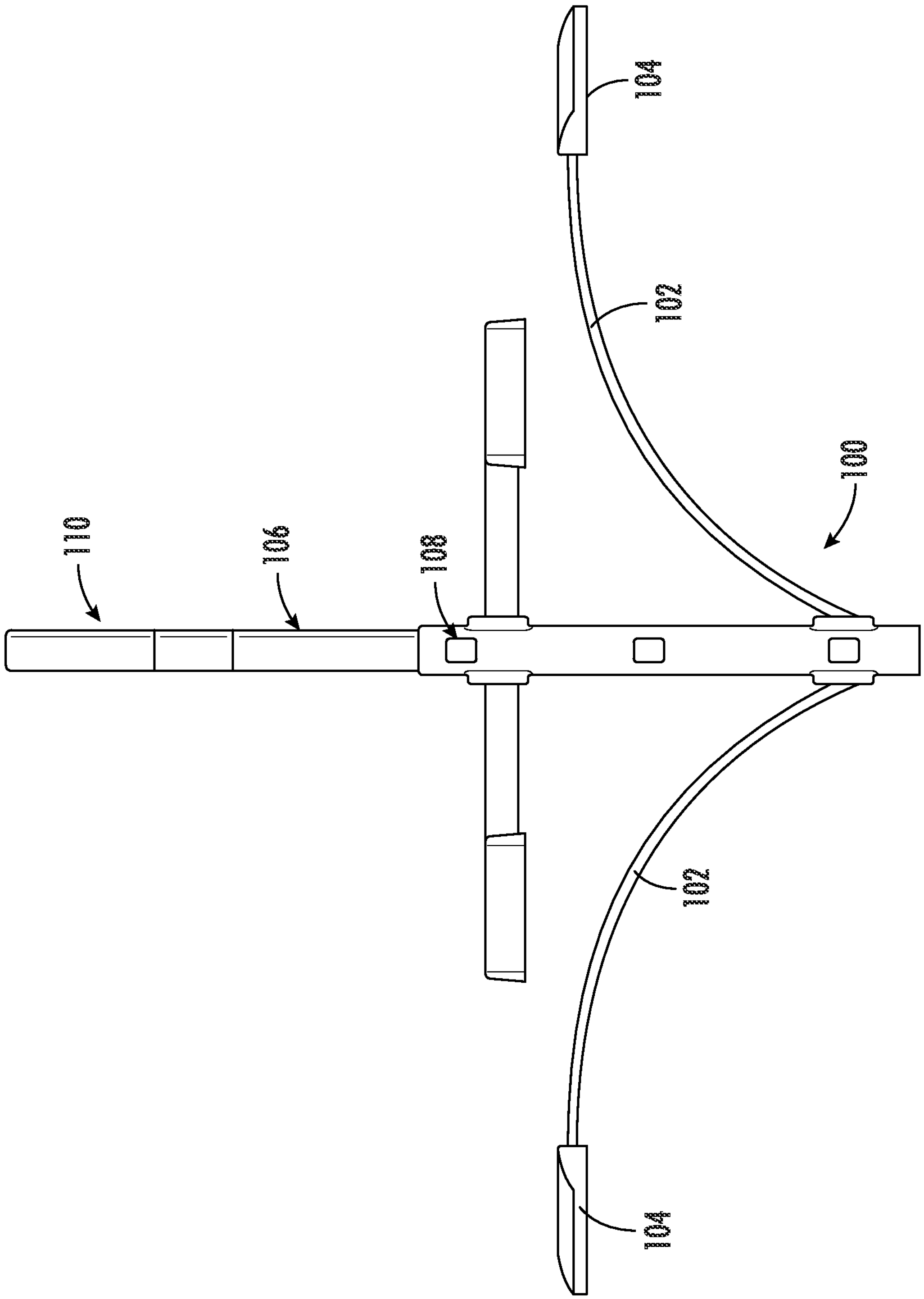
FIG. 1 is a front view of a prior art monopole with an antenna module mounted above a luminaire arm.

The present invention will now be described more fully hereinafter, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein the expression “and/or” includes any and all combinations of one or more of the associated listed items.

In addition, spatially relative terms, such as “under”, “below”, “lower”, “over”, “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees or at other orientations) and the spatially relative descriptors used herein interpreted accordingly.

As used herein, phrases such as "between X and Y" and "between about X and Y" should be interpreted to include X and Y. As used herein, phrases such as "between about X and Y" mean "between about X and about Y". As used herein, phrases such as "from about X to Y" mean "from about X to about Y".

Well-known functions or constructions may not be described in detail for brevity and/or clarity.

Pursuant to embodiments of the present invention, antenna mounts are provided that may allow additional structures such as davit pole luminaire arms or other equipment to be mounted above an antenna mounted to the top of a pole (e.g., a monopole). Antenna mount assemblies are also provided herein. Embodiments of the present invention will now be discussed in greater detail below with reference to FIGS. 1-23B.

Figure 2:
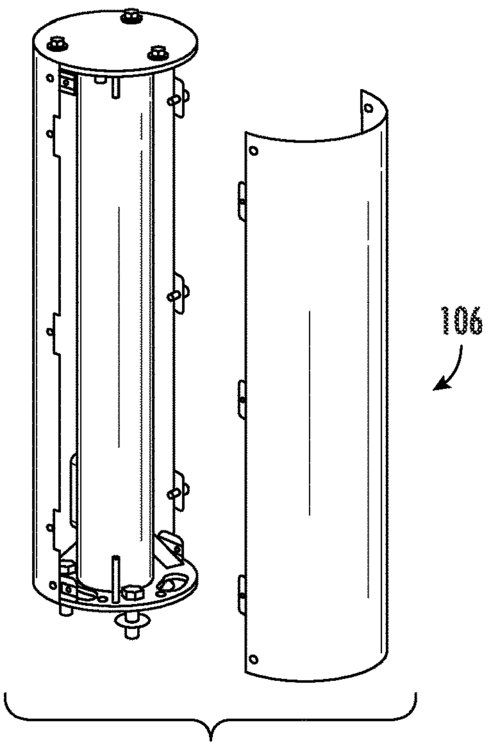
FIG. 2 is a side view of the monopole and antenna module of FIG. 1.
Figure 3:
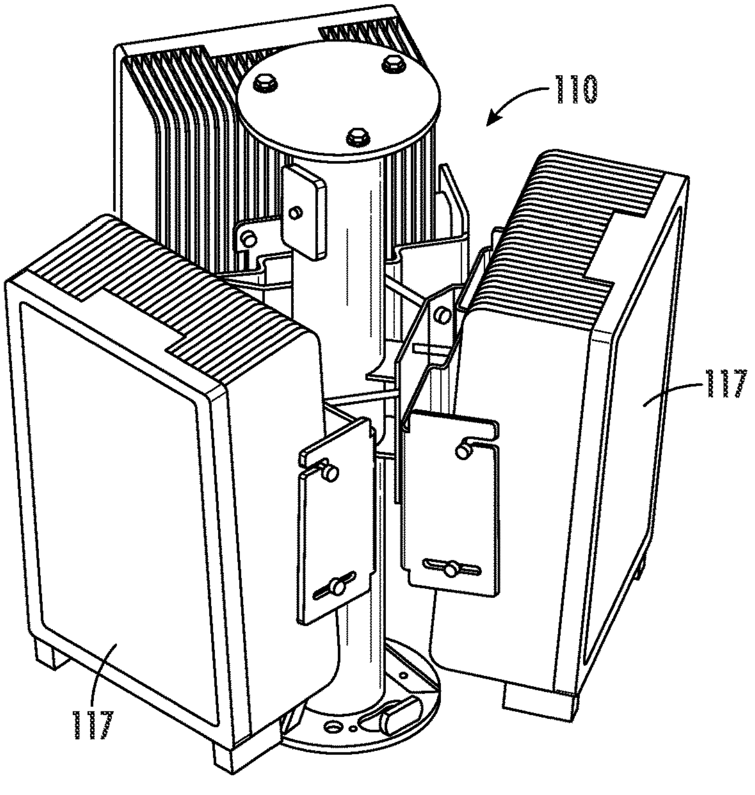
FIG. 3 is a top exploded perspective view of a module as in FIG. 2.
Figure 4:
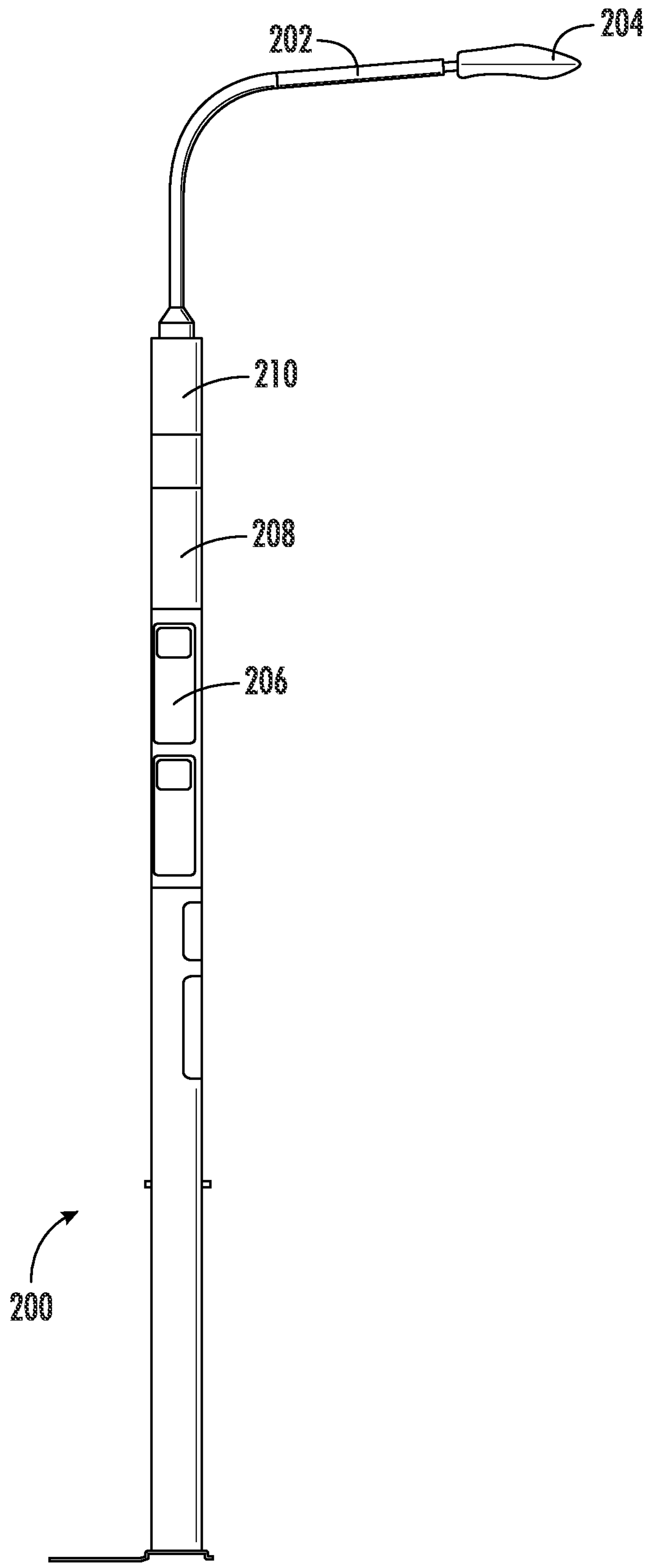
FIG. 4 is a front view of a monopole, module and luminaire arm according to embodiments of the invention, wherein no antennas are mounted in the module.

Referring now to the drawings, a telecommunications monopole designated at 100 is shown in FIGS. 1-3. As can be seen in FIGS. 1 and 2, the monopole 100, which is sized as a "metrocell" having a diameter of between about 6 inches to about 20 inches and a height of between about 20 feet and about 40 feet, is styled as a streetlight, with a luminaire arm 102, on which mounts a luminaire 104 (such as an LED streetlight). An equipment module 106 is mounted above the luminaire arm 102. This configuration is described in detail in U.S. Provisional Patent Application No. 62/968,230, filed Jan. 31, 2020, the disclosure of which is hereby incorporated herein in its entirety. FIG. 2 shows a version of an antenna module 110. The module 110 is covered with a shroud that provides an attractive appearance, particularly when the shroud causes the module 110 to have the same or a similar diameter as the rest of the monopole 100. FIG. 3 shows the antenna module 110 with remote radio units 117 mounted therein and without a cover or shroud.

In some instances, it may be desirable to provide a metrocell configuration on a monopole that also serves as a streetlight in which the arm and luminaire are mounted above the antenna and radio modules. As an example, zoning or housing codes may recommend or require conformity in streetlights that necessitate mounting of the arm and luminaire above the antenna and radio modules.

Referring now to FIGS. 4-10, a monopole 200 having a "gooseneck" or "davit" style luminaire arm 202 mounted thereon is shown therein. A luminaire 204 is mounted on the end of the arm 202. The monopole 200 illustratively includes a 4G equipment module 206, a 5G antenna/equipment module 208, and a module 210 that is similar to the antenna module 110 discussed above, but within a spine 211 that extends above the top plate 212 of the module 210 (typically the spine 211 extends above the top cover 212 between about 4 inches and about 8 inches—see, e.g., FIG. 7). The arm 202 that supports the luminaire 204 is mounted to the module 210 via an integration adapter 220 (shown best in FIGS. 9 and 10), which is discussed in detail below.

Figure 9:
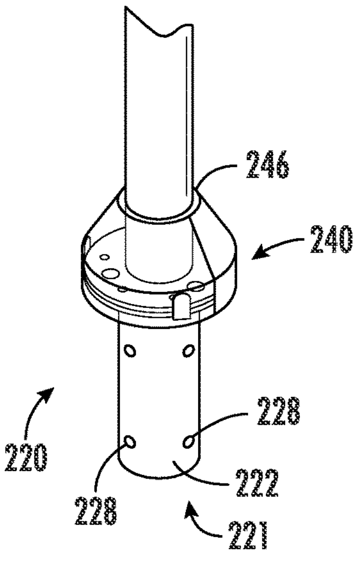
FIG. 9 is an enlarged perspective view of the adapter and base of the luminaire arm of FIG. 8 and a cover.

The integration adapter 220 includes a weldment 221 with a lower sleeve 222 and a flange 224 that is mounted to the upper end of the lower sleeve 222 and extends radially outwardly therefrom. Mounting holes 226 are present in the flange 224; these may be of any pattern, but in some embodiments may follow one or more of the patterns described in U.S. Provisional Patent Application No. 62/858,564, filed Jun. 7, 2019, which is hereby incorporated by reference herein in its entirety. The lower sleeve 222 may also include one or more holes 228 (four are seen in FIG. 9) that can receive set screws or the like to secure the lower sleeve 222 to the spine 211 of the module 210.

The weldment 221 is typically formed of a metallic material, such as steel, but other materials may also be suitable.

As can be seen in FIGS. 7-10, the lower end of the arm 202 has a flange 203 that extends radially outwardly therefrom and serves as a base for the arm 202. Holes 205 are present in the flange 203 that can enable the arm 202 to be mounted onto the flange 224 of the weldment 221 via screws or other fasteners inserted into the holes 205 and 226.

Figure 6:
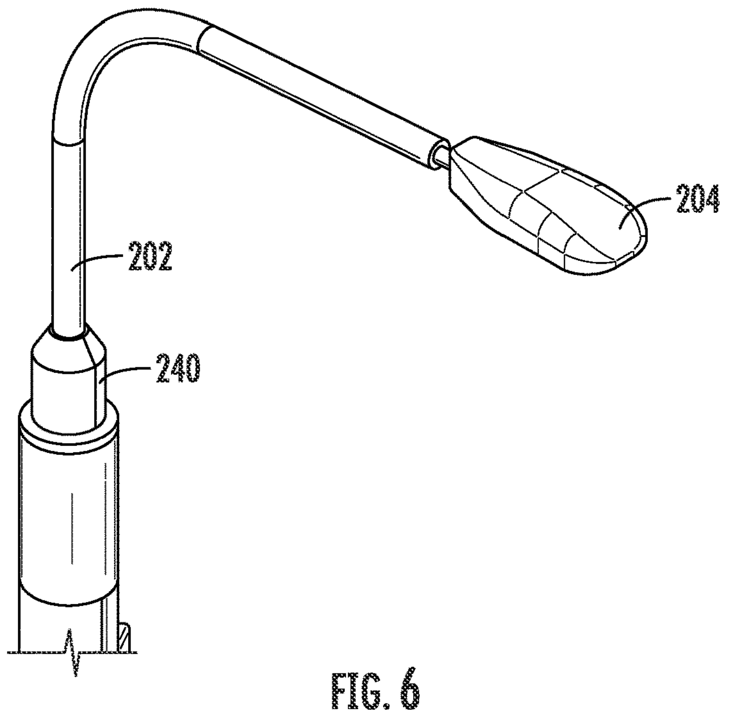
FIG. 6 is a top perspective view of the module and luminaire arm of the monopole of FIG. 4.
Figure 7:
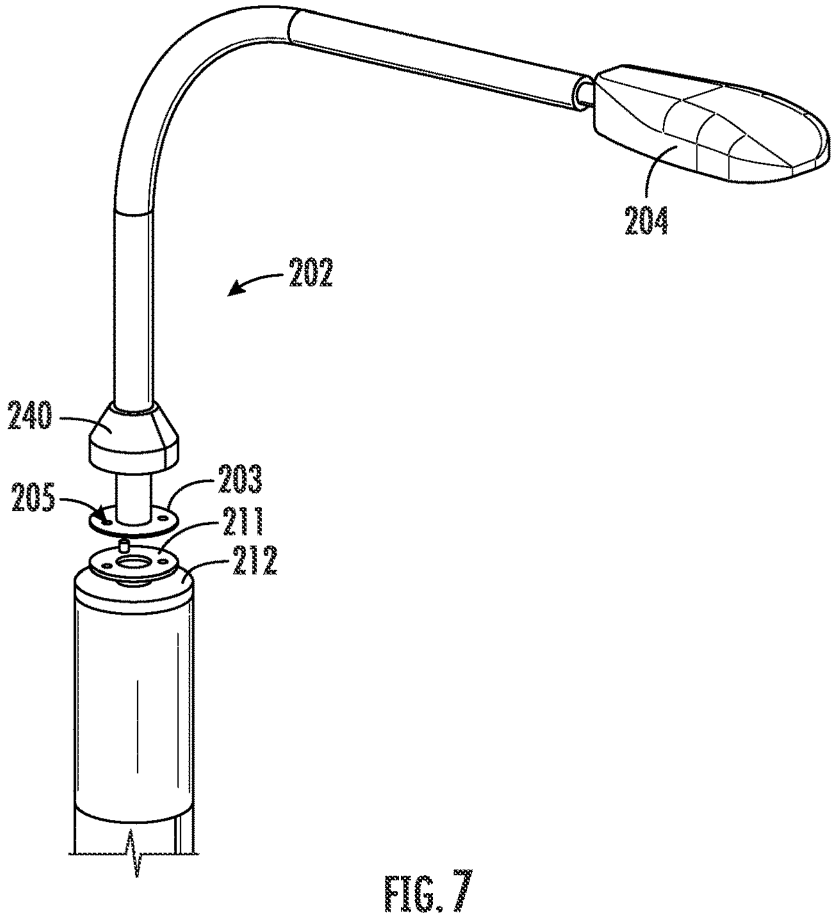
FIG. 7 is an exploded view of the module and luminaire arm of FIG. 6, also showing a top portion an adapter for mounting the luminaire arm on the module.
Figure 8:
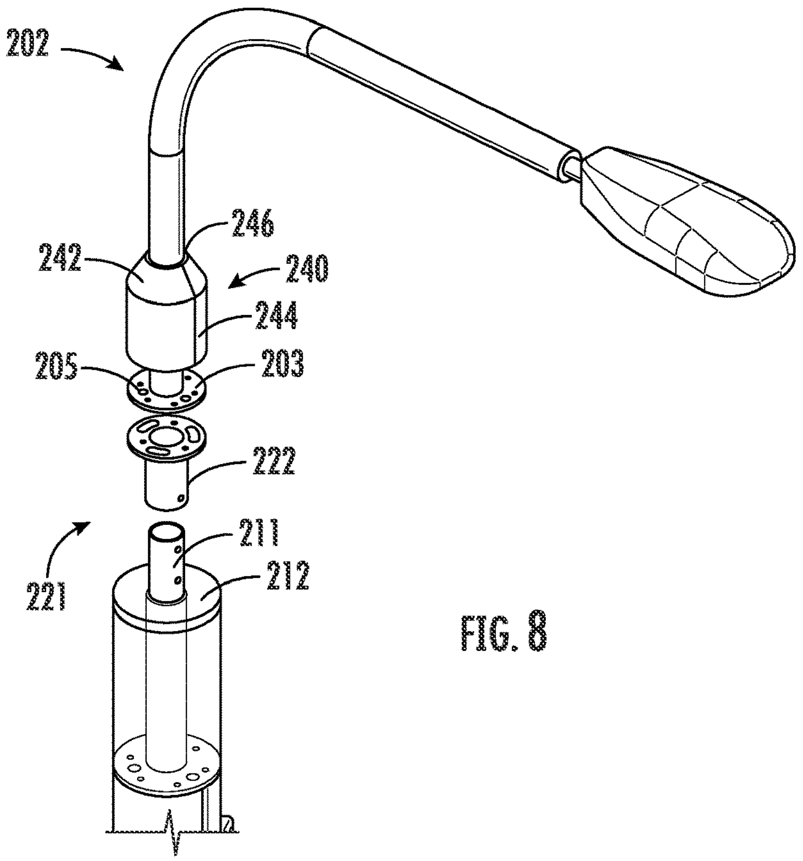
FIG. 8 is an exploded view of the module, luminaire arm and adapter of FIG. 7.

Best seen in FIGS. 6 and 8, a cover 240 has a frusto-conical upper end 242 and a cylindrical lower end 244. The lower end 244 is sized to fit over the flanges 203, 224, and the opening 246 in the upper end 242 is sized to receive the arm 202. The cover 240 is typically formed of a metallic material such as steel, but may also be formed of other materials, such as polymeric materials. The cover 240 may be formed in multiple pieces (e.g., two pieces) for easy assembly.

Figure 10:
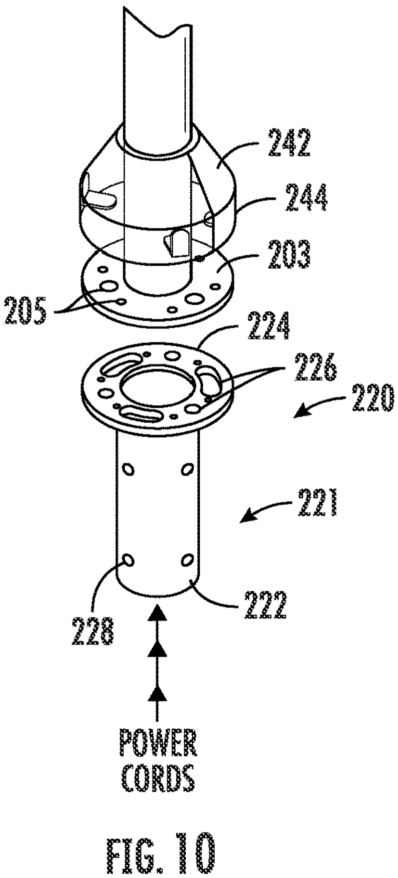
FIG. 10 is an enlarged perspective view of the adapter, cover and luminaire arm base of FIG. 9.

Best seen in FIGS. 8-10, mounting of the luminaire arm 202 begins with the mounting of the weldment 221 onto the module 210. In some embodiments, the weldment 221 may also be a casting or molded part. The lower sleeve 222, which has an inner diameter that is slightly larger than the outer diameter of the spine 211, is slipped over the upper end of the spine 211. The lower sleeve 222 is secured in place with set screws or the like. Power cords for the luminaire 204 are routed through the spine 211 and the lower sleeve 222, and are connected with mating power cords of the luminaire 204. The lower flange 203 is then lowered onto the flange 224 and oriented so that the holes 205 align with the desired holes 226, and screws or other fasteners are employed to secure the flanges 224, 203 to each other. The cover 240 is then installed (e.g., the multiple pieces of the cover 240 are assembled around the arm 202), and lowered into place over the weldment 221. The cover 240 may be installed to mating flanges on the lower sleeve 222. The resulting structure provides a conventional-looking streetlight that has the capability of wireless transmission.

Figure 5:
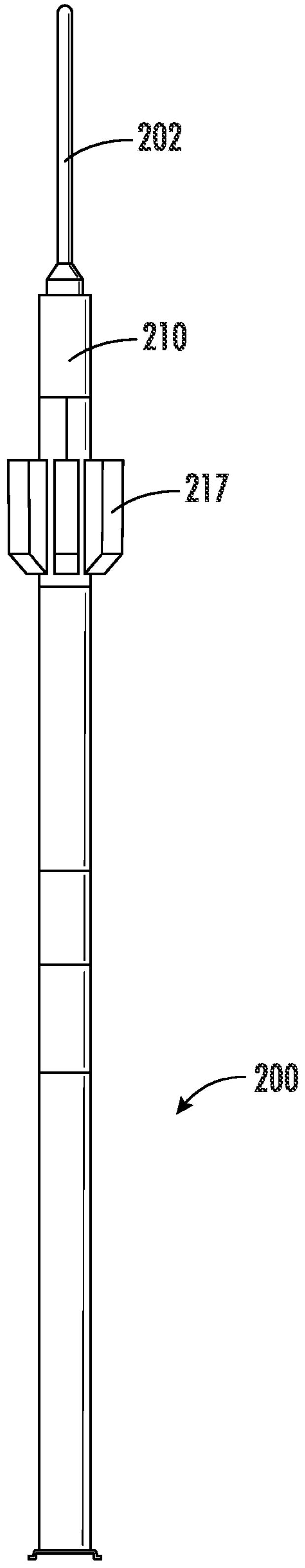
FIG. 5 is a side view of a monopole, module and luminaire arm as in FIG. 4, wherein antennas are mounted in an antenna module.

Those of skill in this art will appreciate that the monopole 200 may take other forms. For example, either or both of the modules 206, 208 may be omitted, or additional modules may be included below the module 210. In some embodiments, a different style of luminaire arm may be employed (e.g., an "acorn", "box light", or "cobra head" style arm and luminaire may be used). As another example, the monopole 200 may be employed to mount additional antennas; this is shown in FIG. 5, wherein antennas 217 are mounted to the module 208, and is shown in FIG. 3, wherein antennas 117 are mounted to the module 110 (this is also discussed in U.S. Provisional Patent Application No. 62/968,230, supra). Other variations may also be apparent to those of skill in this art.

Additionally, although the weldment 221 is shown with a cylindrical sleeve 222, in some embodiments the sleeve 222 may take other forms. For example, one edge of the sleeve 222 may extend lower than the opposite edge. As such, the lower edge of the sleeve 222 may provide additional support against forces applied in a particular direction. For example, this arrangement may be suitable for instances in which the luminaire arm extends generally horizontally (as with a gooseneck-style arm); the sleeve 222 may be rotated so that the longer edge of the sleeve 222 is positioned on the same side of the spine 211 that the luminaire arm 202 extends to provide additional support.

In some embodiments, the sleeve 222 and spine 211 may include features (e.g., a key and slot arrangement) that enable the weldment 221 to be precisely aligned with the spine 211 at the proper orientation. Similarly, the flange 222 and luminaire arm 202 may have features that facilitate such alignment.

It is also contemplated that the module 210, with the extended length spine 211, can provide the capability of stacking two or more modules 210 in vertical relationship. The presence of two antenna modules 210 would allow two different antennas to be used in tandem for neutral host applications, in which two different wireless operators could each use its own antenna on the same monopole and create the appearance of a single pole.

Figure 11:
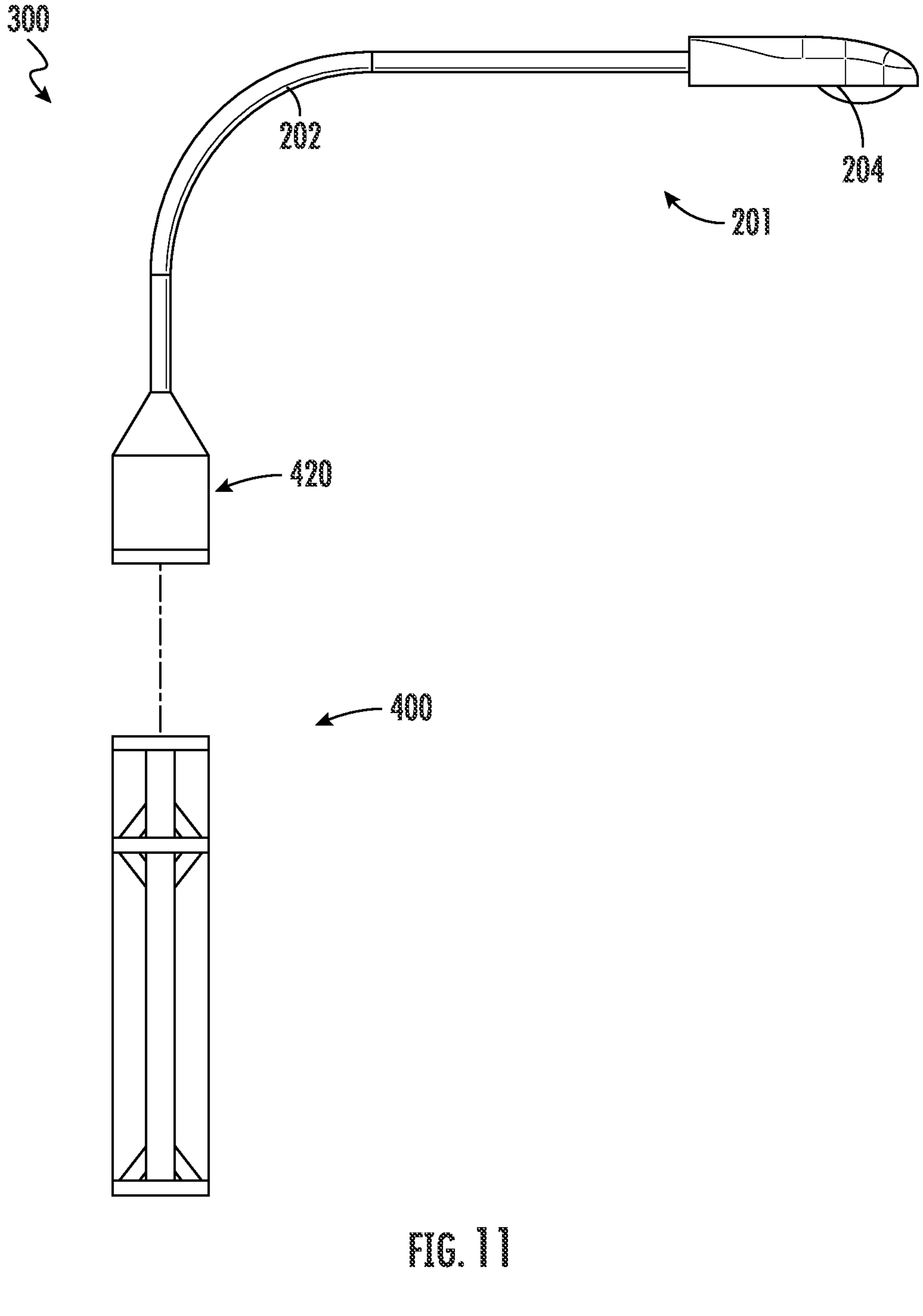
FIG. 11 is a side view of an antenna mount assembly according to embodiments of the present invention.

FIG. 11 illustrates a monopole 300 having a davit style luminaire 202 mounted thereon. The monopole 300 is similar to monopoles 100, 200 discussed herein but utilizes an alternative antenna mount assembly 400 having a different integration adapter 420 according to embodiments of the present invention. Antenna mount assembly 400 is described in further detail below with reference to FIGS. 12A-15C.

Figure 12A:
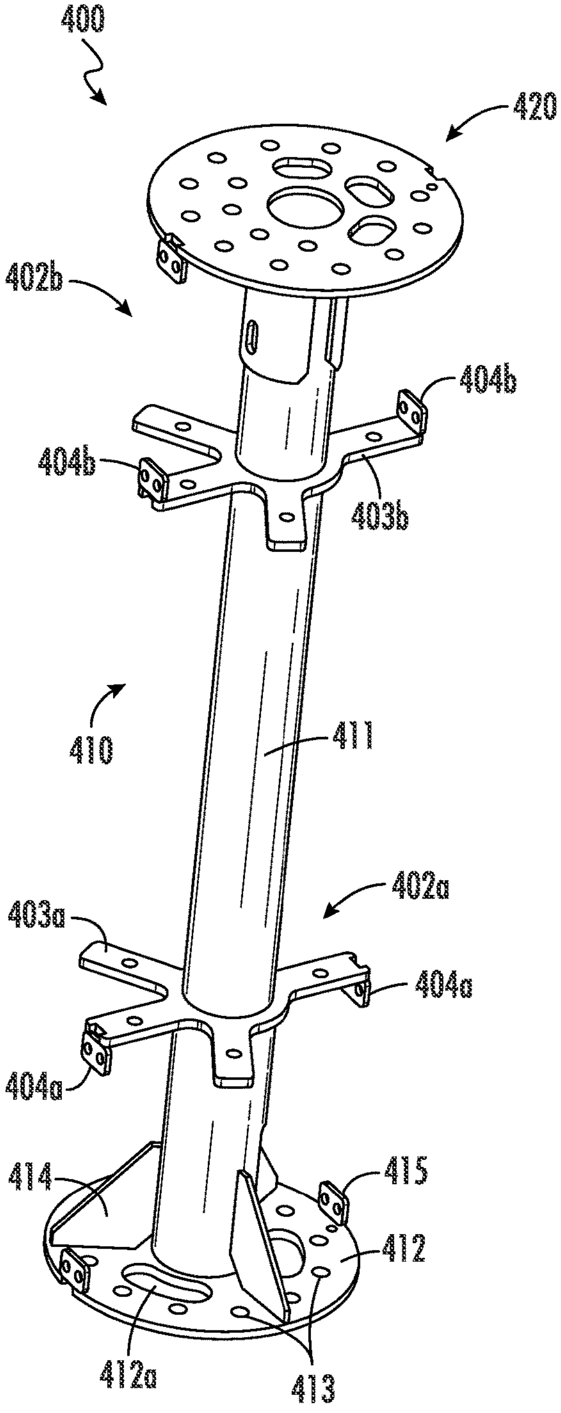
FIG. 12A is a perspective view of an antenna mount according to embodiments of the present invention.
Figure 12B:
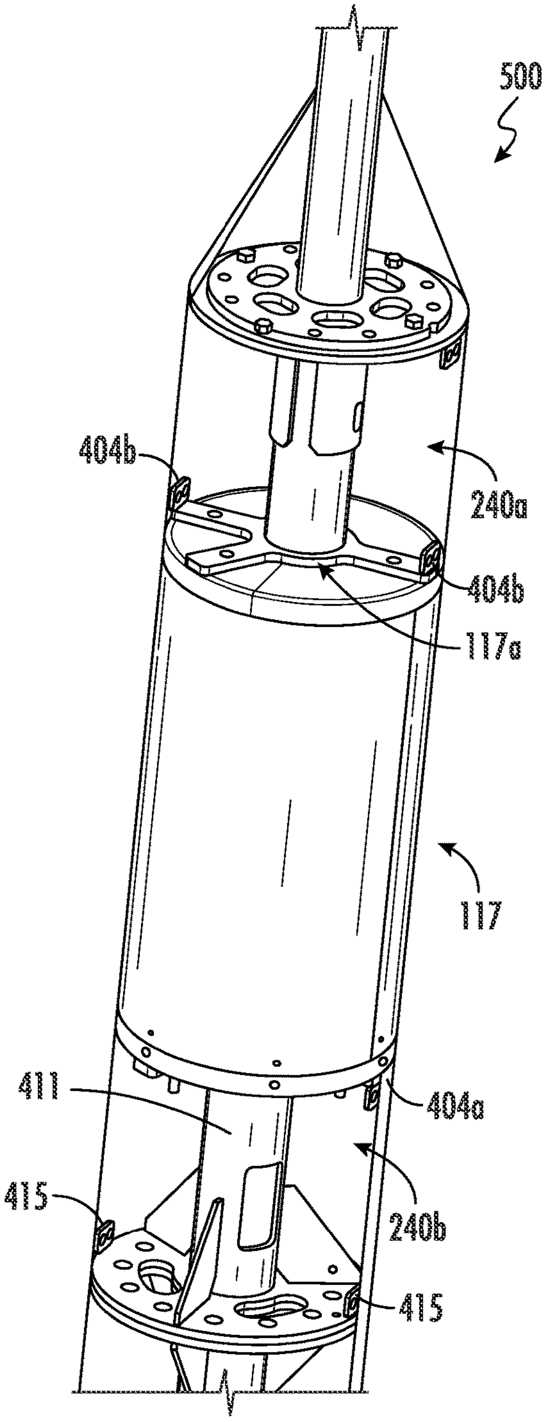
FIG. 12B is a perspective view of the antenna mount of FIG. 12A, wherein an antenna and davit pole assembly are secured to the mount.

FIG. 12A illustrates the antenna mount assembly 400. FIG. 12B illustrates a monopole-streetlight assembly 500 utilizing the antenna mount assembly 400 shown in FIG. 12A. In some embodiments of the present invention, the antenna mount assembly 400 includes an antenna module 410 and a removable integration adapter 420.

Figure 13:
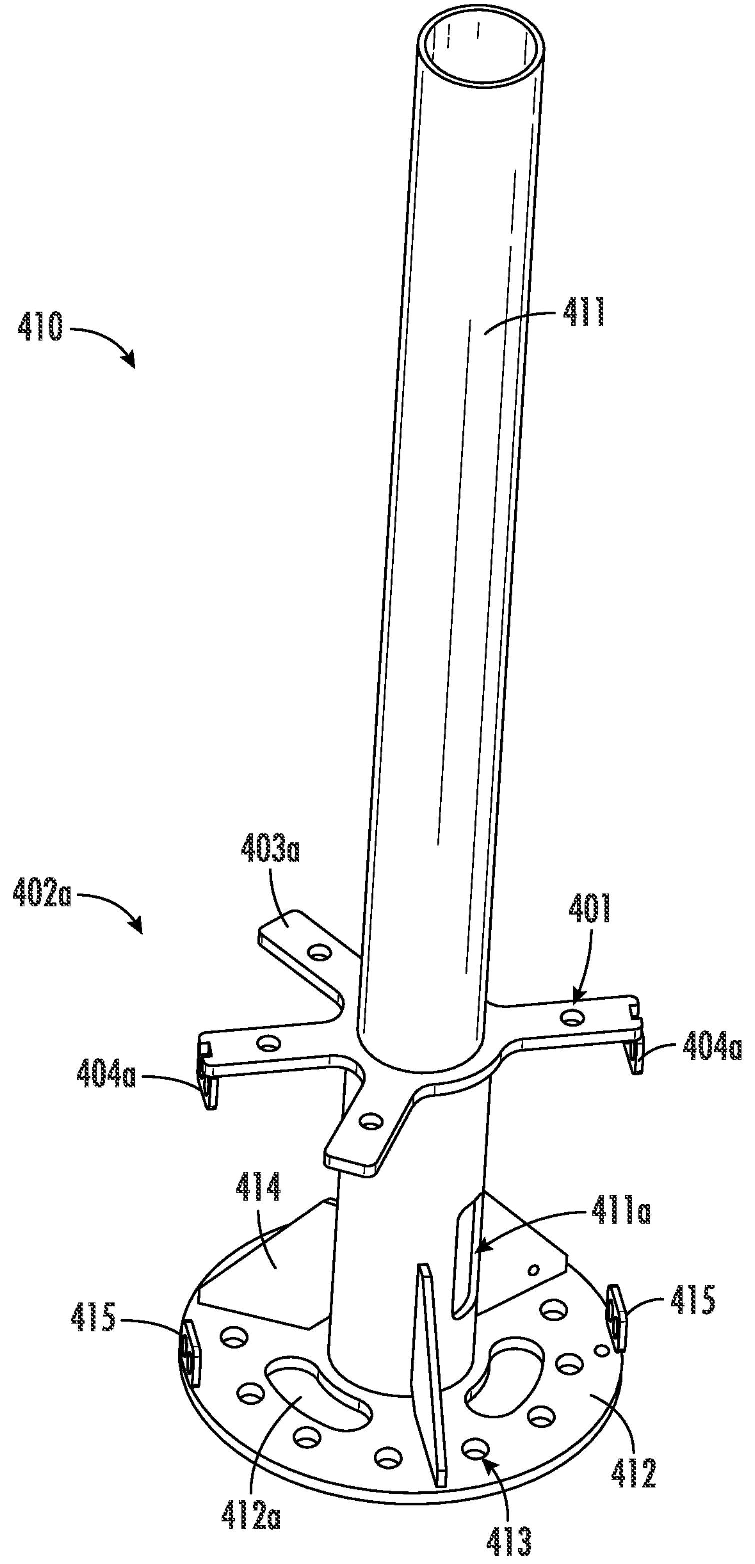
FIG. 13 is a perspective view of the bottom portion of the antenna mount of FIG. 12A.

As shown in FIG. 12B, the antenna module 410 is configured for mounting an antenna 117 having a center through-hole 117*a*. Referring to FIG. 12A and FIG. 13, in some embodiments, the antenna module 410 includes a pole top mount plate 412 and a central spine 411. The central spine 411 is coupled to (e.g., welded) to the pole top mount plate 412 and extends upwardly therefrom. The outer diameter of the central spine 411 is sized to be received by the center through-hole 117*a* of the antenna 117. As shown in FIG. 12B, the central spine 411 is sized such that it extends above the antenna 117 when the antenna 117 is mounted within the antenna module 410. In some embodiments, the central spine 411 may be a hollow tube configured such that power cords (or other cables) for the luminaire 204 (or other equipment) may be routed through the spine 411. The cords or cables may enter the spine 411 through a cable passage 411*a* located at the lower end of the spine 411 (see, e.g., FIG. 13).

As shown in FIG. 12A and FIG. 13, an antenna mounting platform 402*a* is secured to the central spine 411. In some embodiments, the antenna mounting platform 402*a* may be slidably secured to the central spine 411 and thus, may be adjustable for different sized antennas 117. In some embodiments, the platform 402*a* may comprise a plurality of arms 403*a* extending radially outwardly from the center of the platform 402*a* and are configured to support an antenna 117 mounted within the antenna module 410. In some embodiments, one or more of the arms 403*a* may comprise flanges 404*a*. The one or more flanges 404*a* are configured such that a bottom concealment cover 240*b* may be secured to the platform 402*a* (i.e., the antenna mount assembly 400) (see, e.g., FIG. 12B). In some embodiments, the pole top mount plate 412 may further comprise one or more flanges 415 that correspond with the one or more flanges 404*a* of the antenna mounting platform 402*a*. The flanges 415 of the pole top mount plate 412 may be configured such that the bottom concealment cover 240*b* may be further secured to the pole top mount plate 412.

The pole top mount plate 412 is configured to secure the antenna module 410 (and antenna mount assembly 400) to the top of a monopole 100, 200, 300 via a plurality of mounting holes 413. In some embodiments, the pole top mount plate 412 may comprise a plurality of gussets 414 that help provide support to the central spine 411. The pole top mount plate 412 may further comprise one or more cable routing apertures 412*a* sized and configured to allow power cords/cables (not shown) to be routed to/from the monopole 100, 200, 300 and into the central spine 411 (e.g., through cable passage 411*a*).

Figure 14A:
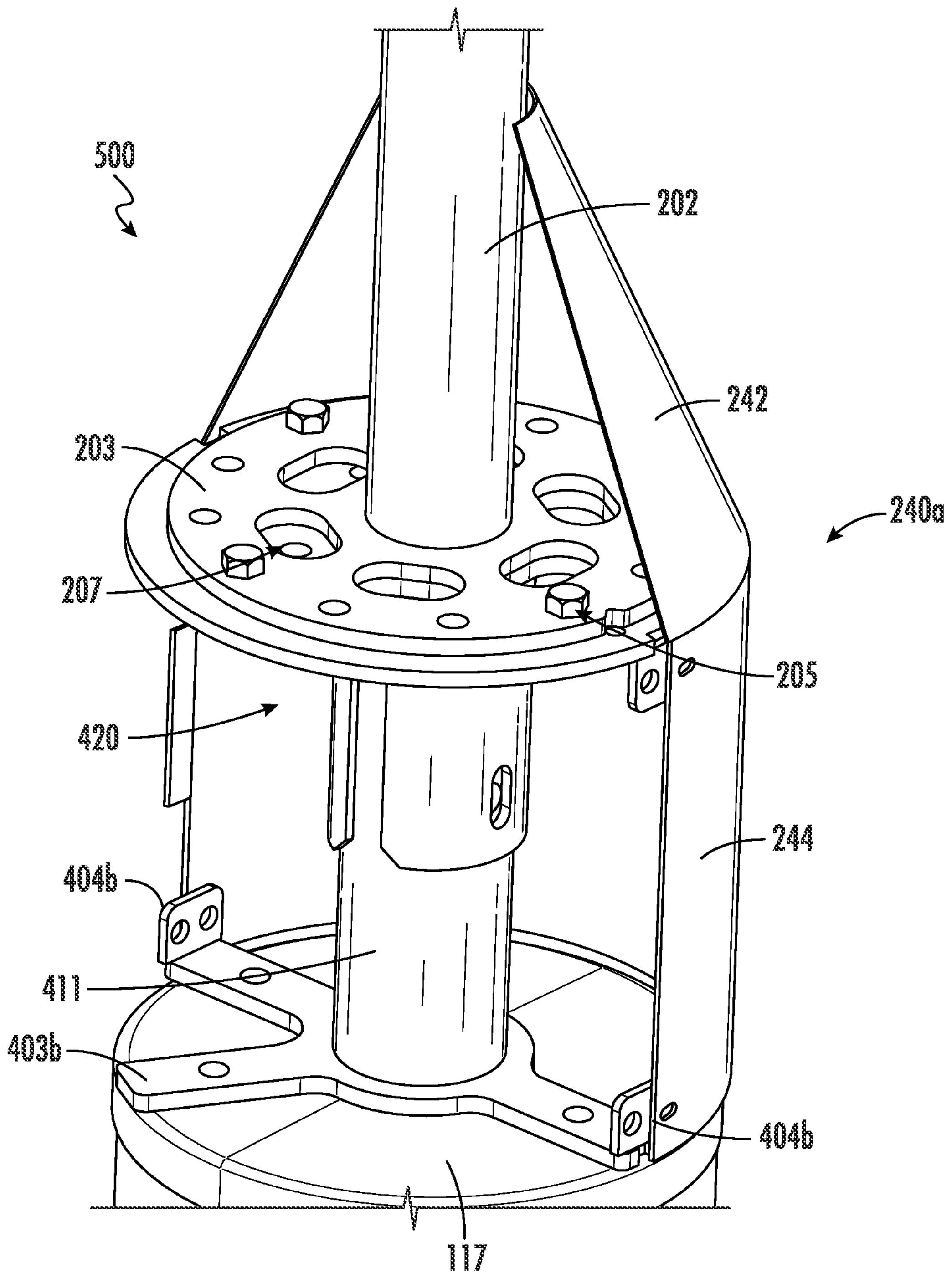
FIG. 14A is an enlarged partial perspective view of the antenna mount of FIG. 12B.

As shown in FIGS. 12A-12B and FIG. 14A, in some embodiments, the antenna mount assembly 400 may further include a cover retaining member 402*b*. The cover retaining member 402*b* may be slidably secured to the central spine 411 of the antenna module 410. In some embodiments, after an antenna 117 has been mounted onto the central spine 411, the cover retaining member 402*b* may be slid onto the central spine 411 and lowered on top of the antenna 117 (i.e., the cover retaining member 402*b* sits on top of the antenna 117). Similar to the antenna mounting platform 402*a*, in some embodiments, the cover retaining member 402*b* may comprise a plurality of arms 403*b* extending radially outwardly from the center of the cover retaining member 402*b*. In some embodiments, one or more of the arms 403*b* may comprise flanges 404*b* that are configured such that a top concealment cover 240*a* (e.g., the cylindrical lower end 244 of cover 240) may be secured to the cover retaining member 402*b* (i.e., the antenna mount assembly 400) (see, e.g., FIG. 12B).

Referring to FIGS. 14A-15C, the removable adapter 420 is configured to be secured to an upper end of the central spine 411 and the base plate 203 of a luminaire unit 201. As shown in FIGS. 14A-15C, and shown best in FIGS. 15A-15C, in some embodiments, the adapter 420 may include a first weldment 421 and a second weldment 430. The first and second weldments 421, 430 are configured to cooperate with each other to secure the adapter 420 to the central spine 411 of the antenna module 410. The first and second weldments 421, 430 may be replaced with other clamp members.

Figure 15A:
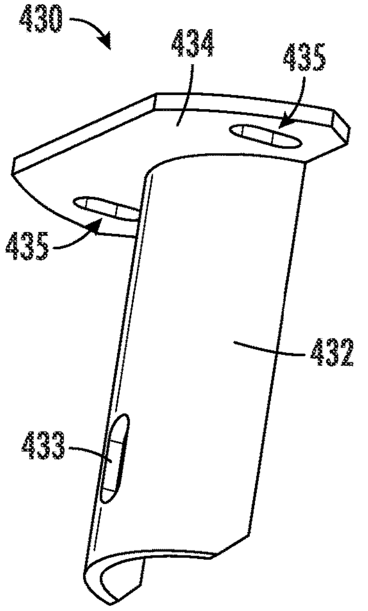
FIGS. 15A-15C are perspective views of a removable adapter for the antenna mount according to embodiments of the present invention.
Figure 15B:
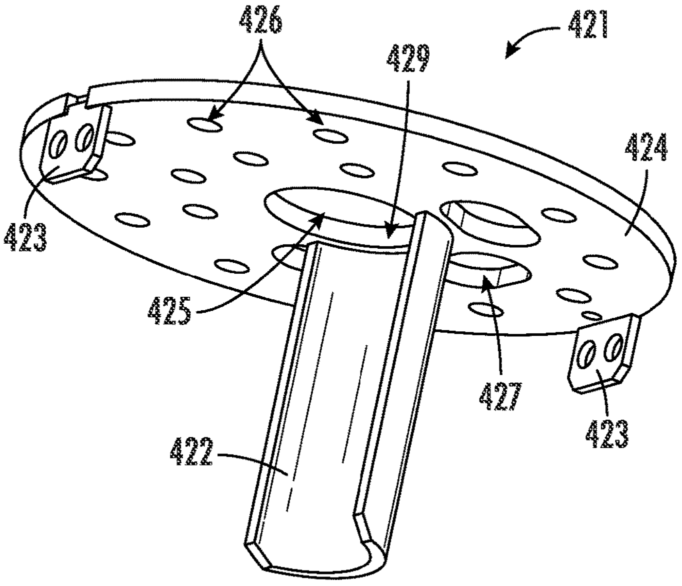

As shown in FIG. 15B, the first weldment 421 includes a partial tubular section 422 and a top plate 424. The top plate 424 extends radially outwardly from the partial tubular section 422. The partial tubular section 422 is sized and configured to cooperate with the profile of the central spine 411. In some embodiments, the partial tubular section 422 generally matches and locates to the outer diameter of the central spine 411 of the antenna module 410. The top plate 424 comprises a plurality of mounting holes 426, 427. One or more of the mounting holes 426 may correspond with mounting holes 205 in the base plate (or flange) 203 of the luminaire unit 201 such that the luminaire unit 201 may be secured to the adapter 420. In some embodiments, e.g., when more than one antenna 117 is stacked in the antenna mount assembly 400, the mounting holes 427 may be used to route cables from the antennas 117.

In some embodiments, the top plate 424 further comprises a central aperture 425. The central aperture 425 is configured to align with the central spine 411 such that power cords/cables extending up through the central spine 411 may be routed through the central aperture 425 and into the arm 202 of the luminaire unit 201 to be connected with mating power cords of the luminaire 204. In some embodiments, the top plate 424 may comprise a lip (or shoulder) 429 between the central aperture 425 and the partial tubular section 422. The lip 429 is configured such that the top plate 424 may sit on top of the central spine 411 when the adapter 420 is secured to the antenna module 410.

In some embodiments, the top plate 424 further comprises one or more flanges 423 that extend downwardly from an outer periphery. Similar to the flanges 404*a*, 404*b* of the antenna mounting platform 402*a* and cover retaining member 402*b*, respectively, the one or more flanges 423 extending from the top plate 424 are configured such that a top concealment cover 240*a* may be secured to the adapter 420 (i.e., the antenna mount assembly 400) (see, e.g., FIGS. 14A-14C and FIG. 15C)

Figure 14B:
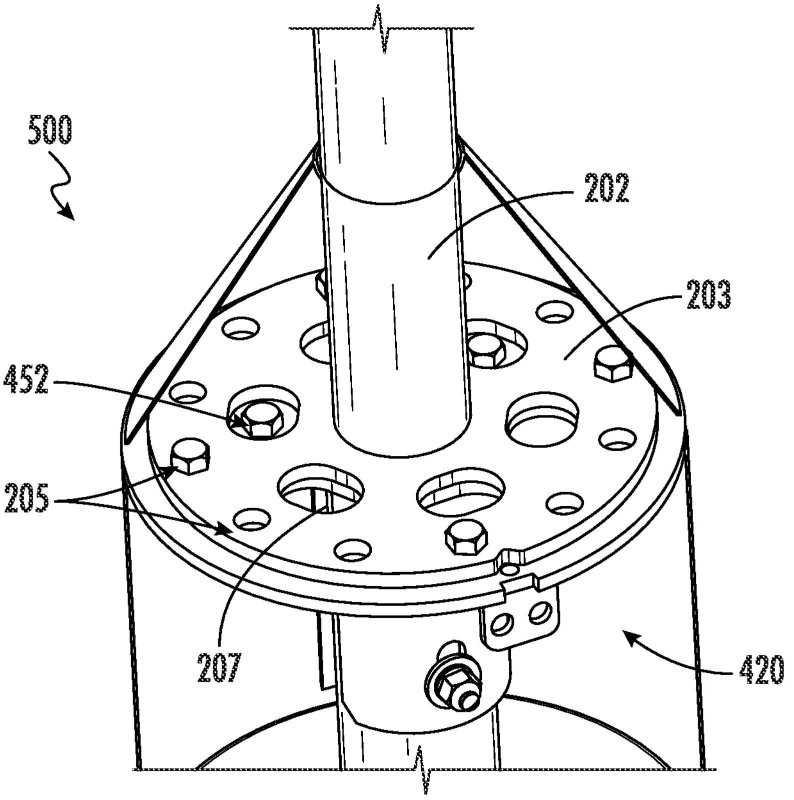
FIG. 14B is a top perspective view of the antenna mount of FIG. 14A.
Figure 14C:
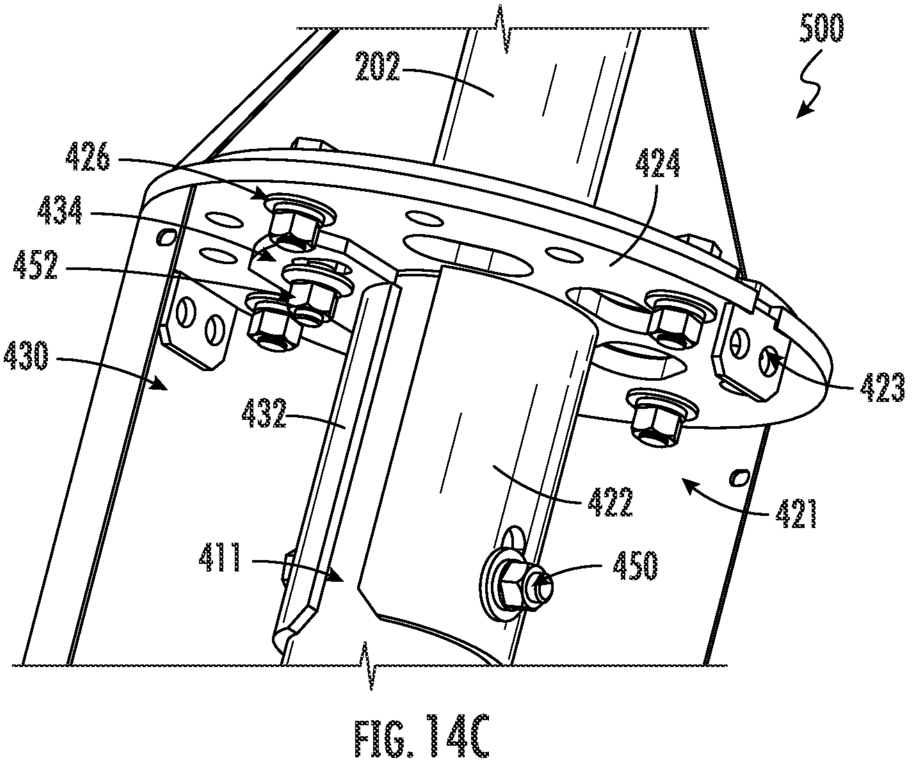
FIG. 14C is a bottom perspective view of the antenna mount of FIG. 14A.

As shown in FIG. 15A, the second weldment 430 also includes a partial tubular section 432. In some embodiments, the partial tubular section 432 of the second weldment 430 generally matches and locates to the outer diameter of the central spine 411 of the antenna module 410. The partial tubular section 432 of the second weldment 430 cooperates with the partial tubular section 422 of the first weldment 421 to engage the upper end of the central spine 411 to secure the removable adapter 420 to the antenna module 410. The second weldment 430 further includes a flange 434 configured to be secured to the top plate 424 of the first weldment 421. For example, the flange 434 may comprise two mounting apertures 435 that may be aligned with corresponding mounting holes 426 in the top plate 424. After the partial tubular sections 422, 432 are positioned against (engaged with) the outer diameter of the central spine 411, vertically oriented fasteners (e.g., top bolts) 452 may be used to secure the second weldment 430 to the first weldment 421 (see, e.g., FIGS. 14B-14C and FIG. 15C), thereby securing the adapter 420 to the antenna module 410. As shown in FIG. 14B, it is noteworthy that the base plate 203 of the luminaire unit 201 may comprise larger apertures 207 (i.e., larger than mounting holes 205) that align with the two mounting holes 426 in the top plate 424 configured to receive fasteners 452. The larger apertures 207 allow the second weldment 430 to be secured to the first weldment 421 without the base plate 203 interfering with the fasteners 452.

Figure 15C:
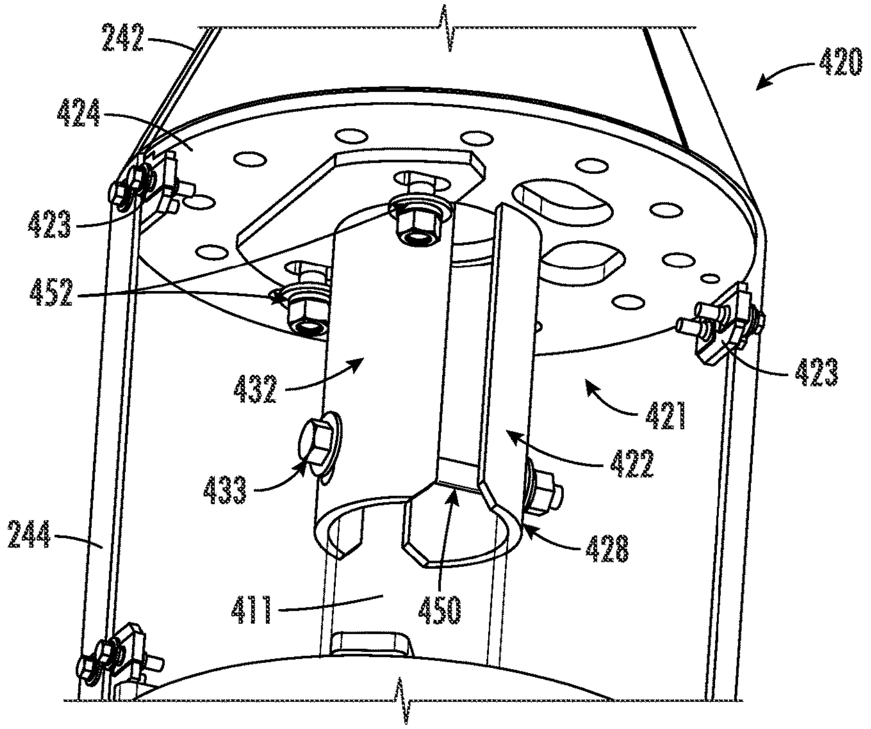

As shown in FIG. 15C, in some embodiments, each of the partial tubular sections 422, 432 comprise one or more securing aperture 433, 428 configured to receive a through bolt 450. One or more through bolts 450 may be used to lock both weldments 421, 430 of the adapter 420 radially through the central spine 411 of the antenna module 410.

Providing the adapter 420 in multiple pieces (i.e., first and second weldments 421, 430 (or clamp members) may allow for easier installation of the adapter 420 onto the top of the spine 411, provide for a more secure fit of the adapter 420 to the spine 411, and allow for the adapter 420 to be adjustable to accommodate variances in the diameter of the spine 411.

Alternative removable integration adapters 620, 720, 820, 920 are illustrated in FIGS. 16-19. These alternative adapters 620, 720, 820, 920 may be used with the antenna modules 210, 410 described herein. Similar to adapter 420, the removable adapters 620, 720, 820, 920 described below each include a first weldment 621, 721, 821, 921 and a second weldment 630, 730, 830, 930 configured to cooperate with each other to secure the respective adapters 620, 720, 820, 920 to the central spine 411 of the antenna module 210, 410. The difference is that each adapter 620, 720, 820, 920 further includes a locking mechanism that draws the first and second weldments together to secure the weldments to the central spine 411 (see also, e.g., FIGS. 16-19).

Figure 16:
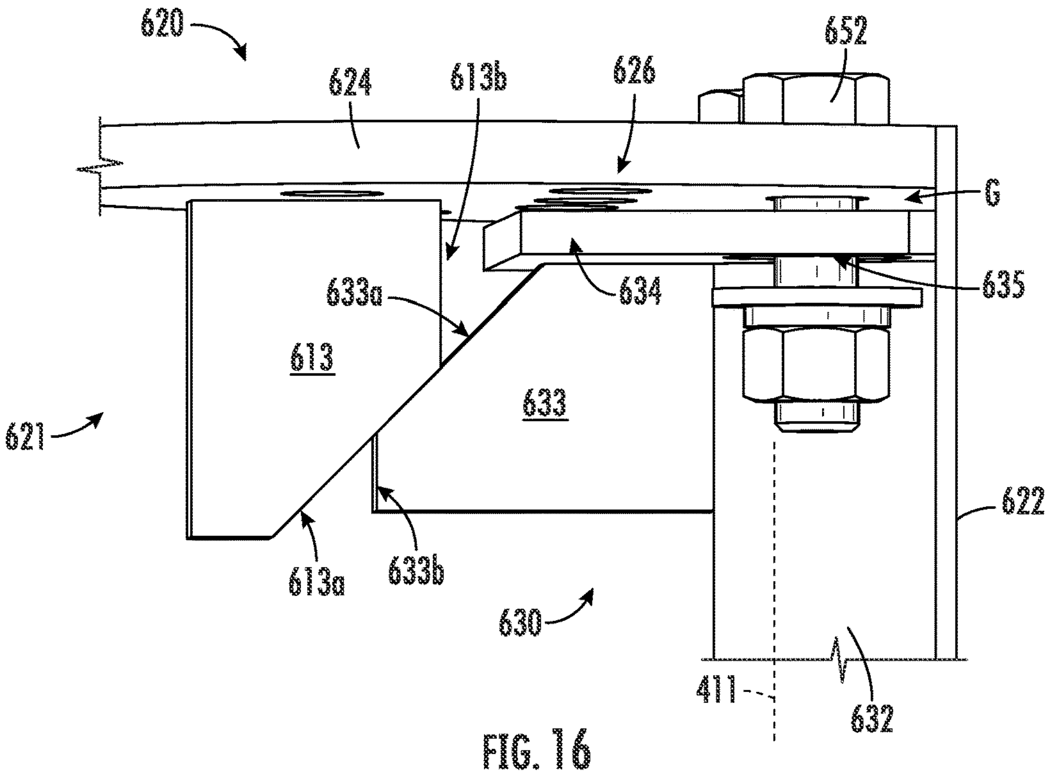
FIG. 16 is a side view of an alternative removable adapter for the antenna mount according to embodiments of the present invention.

Referring to FIG. 16, similar to the first weldment 421 of adapter 420, the first weldment 621 of adapter 620 includes a partial tubular section 622 and a top plate 624 having a plurality of mounting holes 626. The first weldment 621 differs from the first weldment 421 of adapter 420 in that the first weldment 621 further includes a ramp member 613. The ramp member 613 has an angled surface 613*a* and extends downwardly from the top plate 624.

Similar to the second weldment 430 of adapter 420, the second weldment 630 of adapter 620 includes a partial tubular section 632 and a flange 634. The flange 634 may comprise two mounting apertures 635 that are configured to be aligned with corresponding mounting holes 626 in the top plate 624 such that the flange 634 may be secured to the top plate 624 of the first weldment 621 by fasteners 652 (e.g., top bolts). The second weldment 630 differs from the second weldment 430 of adapter 420 in that the second weldment 630 further includes a ramp member 633. In some embodiments, the ramp member 633 may be coupled to the flange 634 and extend radially outwardly from the partial tubular section 632. In some embodiments, the ramp member 633 may be a separate member configured to be secured to the second weldment 630. The ramp member 633 has an angled surface 633*a* that corresponds to the angled surface 613*a* of the ramp member 613 of the first weldment 621. The ramp member 633 of the second weldment 630 is configured to slide against the ramp member 613 of the first weldment 621 (i.e., along angled surfaces 613*a*, 633*a*).

As shown in FIG. 16, when the second weldment 630 is initially secured to the first weldment 621 (i.e., before the fasteners 652 are fully tightened), there may be a gap G between the top plate 624 of the first weldment 621 and the flange 634 of the second weldment 630. As the fasteners 652 are tightened, the flange 634 is pulled upwardly toward the top plate 624 (reducing the gap G) which slides ramp member 633 up ramp member 613 along angled surfaces 613*a*, 633*a*, while also moving the partial tubular sections 622, 632 toward each other to engage opposing sides of the upper end of the spine 411. The fasteners 652 are tightened until the spine 411 is secured between the partial tubular sections 622, 632, thereby securing the adapter 620 to the antenna module 210, 410. In some embodiments, the fasteners 652 may be tightened until the edge 633*b* of ramp member 633 abuts the edge 613*b* of ramp member 613, further locking the partial tubular sections 622, 632 in place against the central spine 411. In some embodiments, one or more through bolts 450 may be used to lock both weldments 621, 630 of the adapter 620 radially through the central spine 411 of the antenna module 210, 410.

Figure 17:
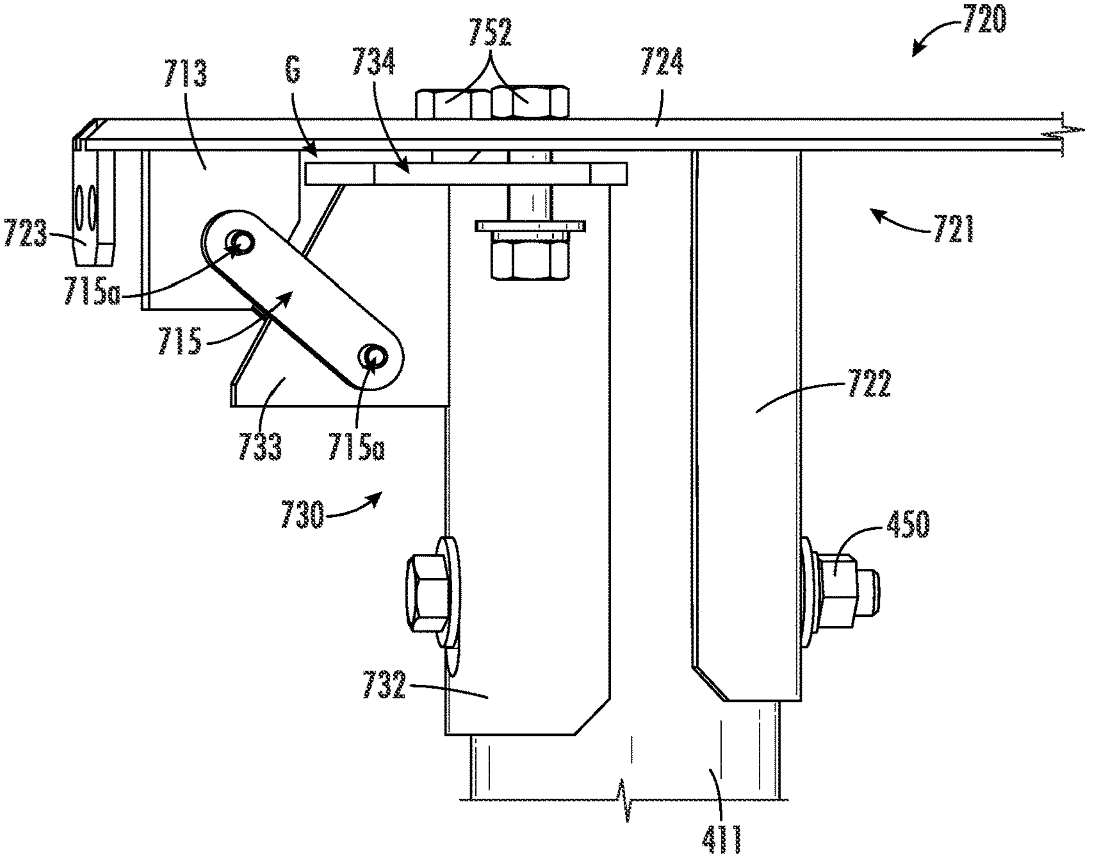
FIG. 17 is a side view of another alternative removable adapter for the antenna mount according to embodiments of the present invention.

Referring now to FIG. 17, similar to other integration adapters 420, 620 described herein, adapter 720 includes first and second weldments 721, 730 configured to cooperate with each other to secure the adapter 720 to the central spine 411 of the antenna module 210, 410. Similar to removable adapter 620, the removable adapter 720 illustrated in FIG. 17 includes a locking mechanism that draws the first and second weldments 721, 730 together to secure the adapter 720 to the central spine 411.

The first and second weldments 721, 730 are similar to weldments 621, 630 in that they include partial tubular sections 722, 732, ramp members 713, 733, and a top plate 724 and flange 734, respectively. As shown in FIG. 17, adapter 720 differs from adapter 620 in that adapter 720 includes one or more link assemblies that mate the first and second weldments 721, 730 together. For example, in some embodiments, the first and second weldments 721, 730 (i.e., ramp members 713, 733) may be connected by one or more pivoting links 715 and retaining pins 715*a*.

When the adapter 720 is installed onto the antenna module 410, 610, the link 715 is be positioned at an appropriate angle to the horizontal such that, when the fasteners 752 (e.g., top bolts) are tightened (i.e., drawn together), ramp member 733 is pulled up with the flange 734 causing the link 715 to pivot on the retaining pins 715*a*. As the link 715 pivots, the ramp member 733 (and the partial tubular section 732) is pushed toward the central spine 411, thereby locking the central spine 411 between the partial tubular sections 732, 722. In some embodiments, tension in the fasteners 752 lock the partial tubular sections 722, 732 to the spine 411 before the gap G between the flange 734 and the top plate 724 is closed completely. In some embodiments, one or more through bolts 450 may be used to lock both weldments 721, 730 of the adapter 720 radially through the central spine 411 of the antenna module 210, 410.

Figure 18:
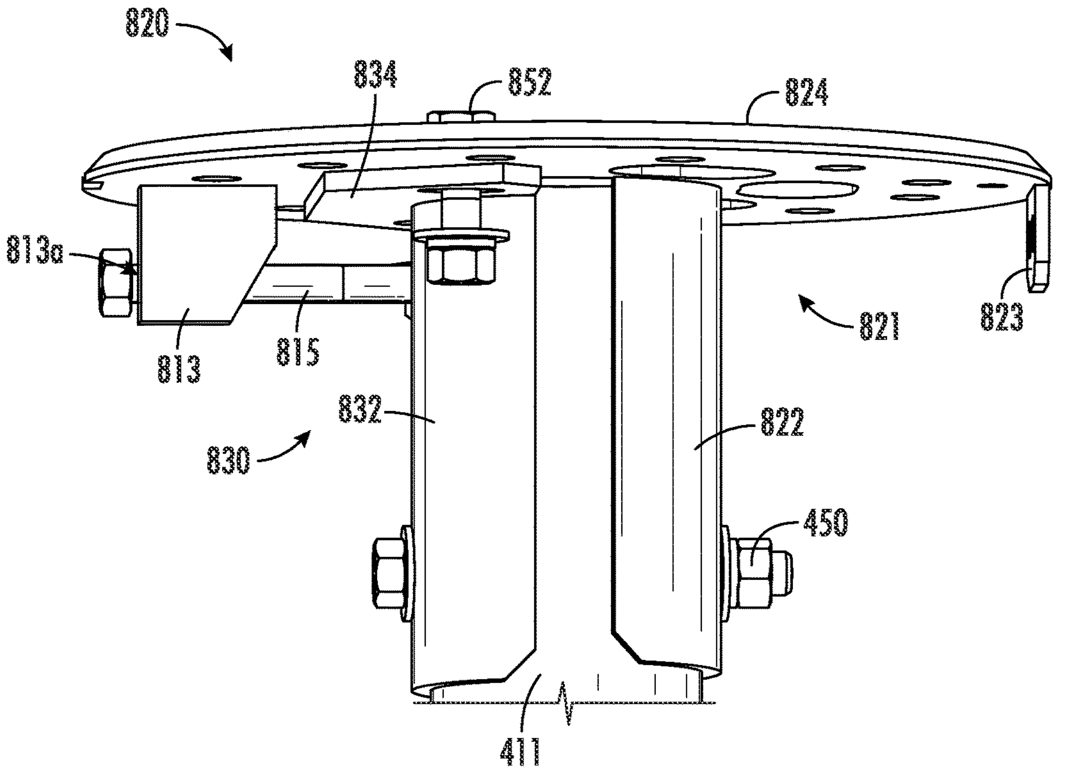
FIG. 18 is a side view of a further alternative removable adapter for the antenna mount according to embodiments of the present invention.

Referring now to FIG. 18, the removable integration adapter 820 includes first and second weldments 821, 830 configured to cooperate with each other to secure the adapter 820 to the central spine 411 of the antenna module 210, 410. Similar to adapters 620, 720 described herein, the adapter 820 illustrated in FIG. 18 includes a locking mechanism that draws the first and second weldments 821, 830 together to secure the adapter 820 to the central spine 411.

Adapter 820 is also similar to adapter 420 described herein (see, e.g., FIGS. 15A-15C) in that partial tubular sections 822, 832 are positioned against (engaged with) the outer diameter of the central spine 411 and fasteners 852 (e.g., top bolts) are used to secure the second weldment 830 to the first weldment 821, thereby securing the adapter 820 to the antenna module 210, 410. As shown in FIG. 18, adapter 820 differs from adapter 420 in that the first weldment 821 further includes one or more radially-extending bolts 815 configured to further clamp the first and second weldments 821, 830 (i.e., the partial tubular sections 822, 832, respectively) to the central spine 411.

In some embodiments, the first weldment 821 may include a threaded mounting block 813 coupled to the top plate 824. The threaded mounting block 813 includes one or more apertures 813*a* configured to receive the radial bolt(s) 815. After the first and second weldments 821, 830 are secured together by fasteners 852 (i.e., the flange 834 of the second weldment 830 is secured to the top plate 824 of the first weldment), the radial bolt 815 is used to clamp the partial tubular sections 822, 832 to the central spine 411. In some embodiments, the second weldment 830 may include a block (not shown) for the radial bolt 815 to push against (i.e., instead of pushing against the surface of the partial tubular section 832). In some embodiments, one or more through bolts 450 may be used to lock both weldments 821, 830 of the adapter 820 radially through the central spine 411 of the antenna module 210, 410.

Figure 19:
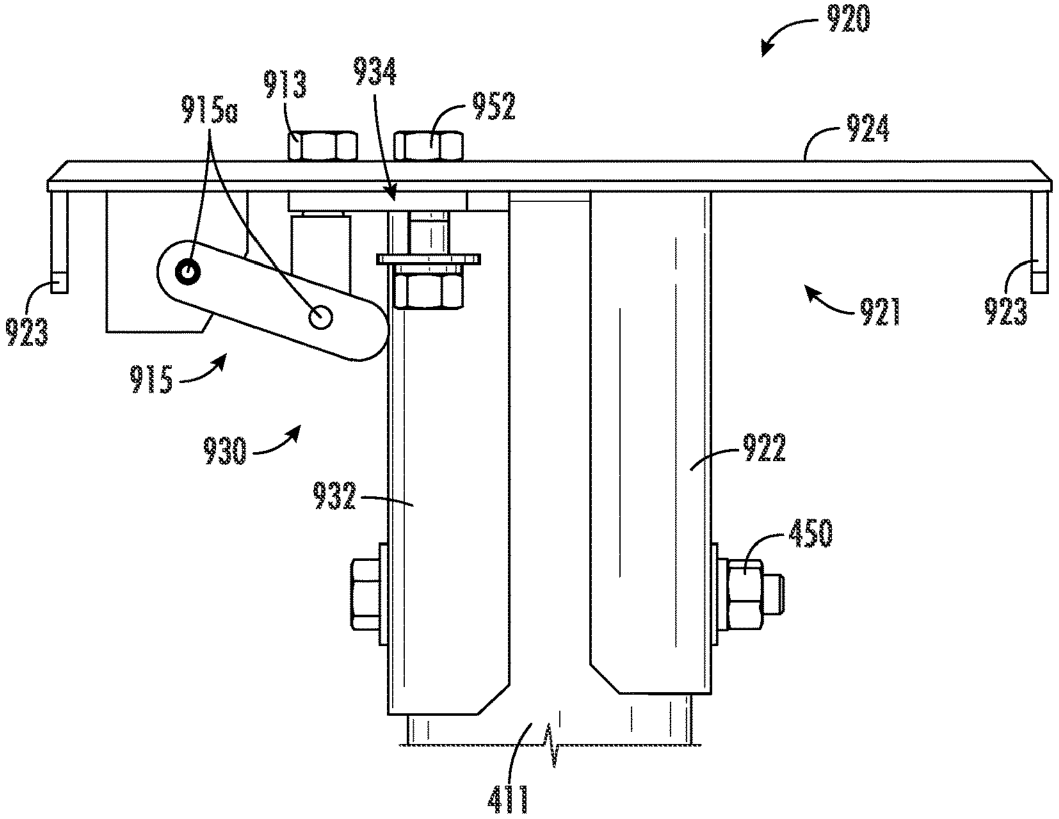
FIG. 19 is a side view of yet another alternative removable adapter for the antenna mount according to embodiments of the present invention.

Referring now to FIG. 19, the removable integration adapter 920 includes first and second weldments 921, 930 configured to cooperate with each other to secure the adapter 920 to the central spine 411 of the antenna module 210, 410. Similar to the other adapters 620, 720, 820 described herein, adapter 920 illustrated in FIG. 19 includes a locking mechanism (e.g., a cam) that draws the first and second weldments 921, 930 together to secure the adapter 920 to the central spine 411.

Adapter 920 is similar to adapters 420, 820 described herein (see, e.g., FIGS. 15A-15C and FIG. 18) in that partial tubular sections 922, 932 are positioned against (engaged with) the outer diameter of the central spine 411 and fasteners 952 (e.g., top bolts) are used to secure the second weldment 930 to the first weldment 921, thereby securing the adapter 920 to the antenna module 210, 410. As shown in FIG. 19, adapter 920 differs from adapters 420, 620 in that the first weldment 921 further includes a cam assembly 915 configured to further clamp the first and second weldments 921, 930 (i.e., the partial tubular sections 922, 932, respectively) to the central spine 411.

In some embodiments, the cam assembly 915 is coupled to the top plate 924 of the first weldment 921 using pivot pins 915*a*. In some embodiments, the cam assembly 915 may look and function in a similar manner to the locking mechanism (e.g., link assembly 715, 715*a*) of adapter 720 described herein (see, e.g., FIG. 17). The cam assembly 915 is configured to mount a fastener 913 (e.g., top bolt) to one of the pivot pins 915*a*. After the first and second weldments 921, 930 are secured together by fasteners 952 (i.e., the flange 934 of the second weldment 930 is secured to the top plate 924 of the first weldment 921), the fastener 913 is tightened which causes the cam 915 to be drawn (or be pulled) upward while at the same time pivoting on the pivot pins 915*a*. As the cam 915 pivots, the partial tubular sections 922, 932 are pushed toward the central spine 411, thereby locking (clamping) the central spine 411 between the partial tubular sections 932, 922. In some embodiments, one or more through bolts 450 may be used to lock both weldments 921, 930 of the adapter 920 radially through the central spine 411 of the antenna module 210, 410.

Figure 20A:
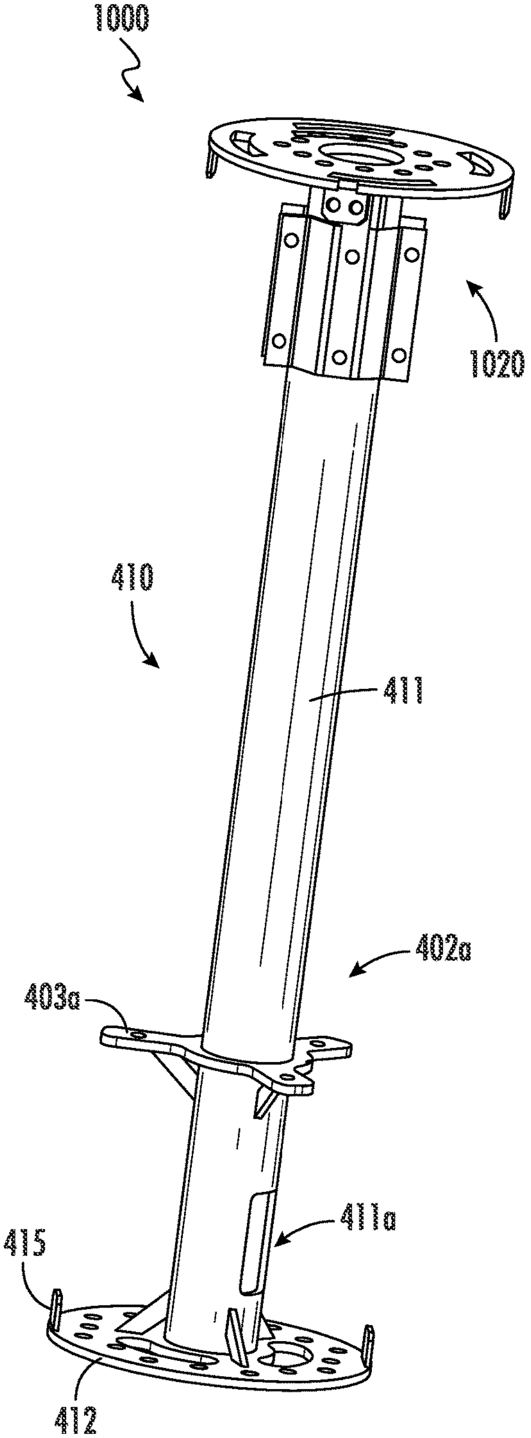
FIG. 20A is a perspective view of an antenna mount including an additional alternative removable adapter according to embodiments of the present invention.
Figure 20B:
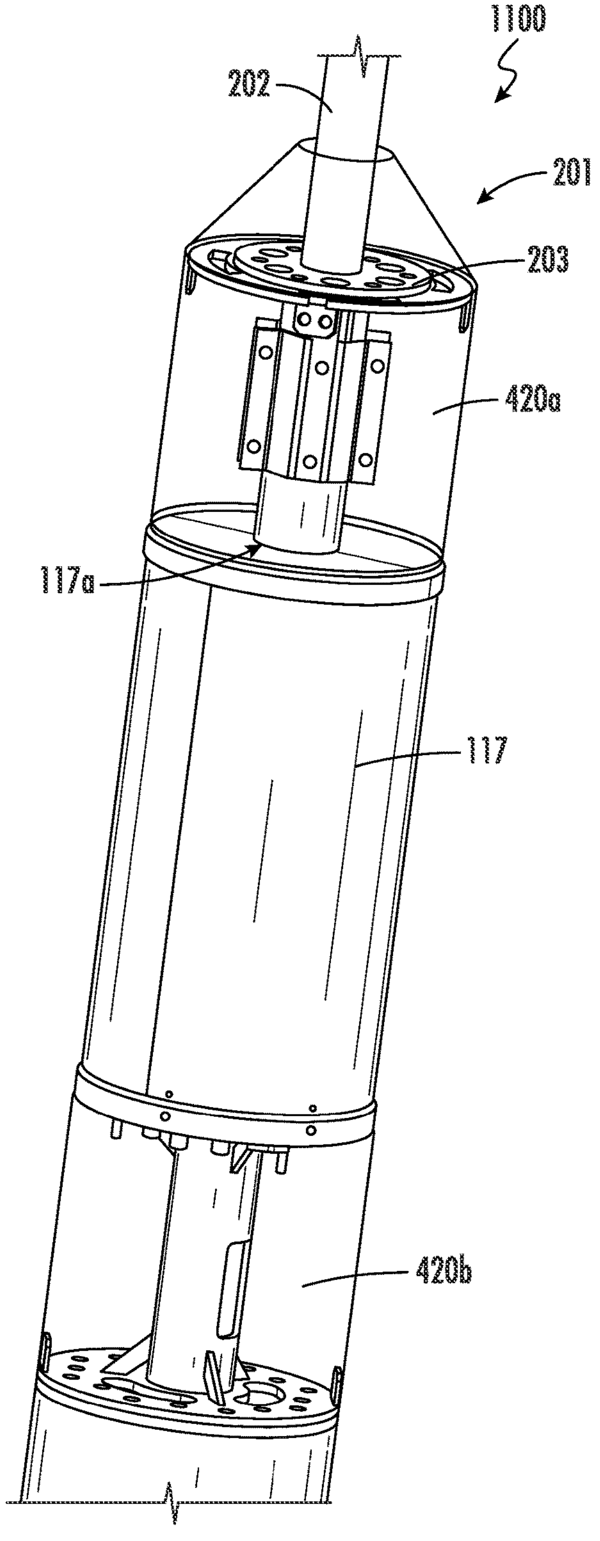
FIG. 20B is a perspective view of the antenna mount of FIG. 20A, wherein an antenna and davit pole assembly are secured to the mount.

Referring now to FIGS. 20A-22C, an antenna mount assembly 1000 according to embodiments of the present invention is illustrated. FIG. 20A illustrates the antenna mount assembly 1000. FIG. 20B illustrates a monopole-streetlight assembly 1100 utilizing the antenna mount assembly 1000. The antenna mount assembly 1000 includes an alternative removable integration adapter 1020 that may be utilized with the antenna modules 210, 410 described herein. The adapter 1020 is described in further detail below with reference to FIGS. 21A-22C. Note that features of the adapter 1020 may be similar to those of other adapters 420, 620, 720, 820, 920 described herein. Thus, properties and/or features of the adapter 1020 may be described above in references to FIGS. 12A-19, and duplicate discussions thereof may be omitted herein for purposes of discussing FIGS. 21A-22C.

Figure 22A:
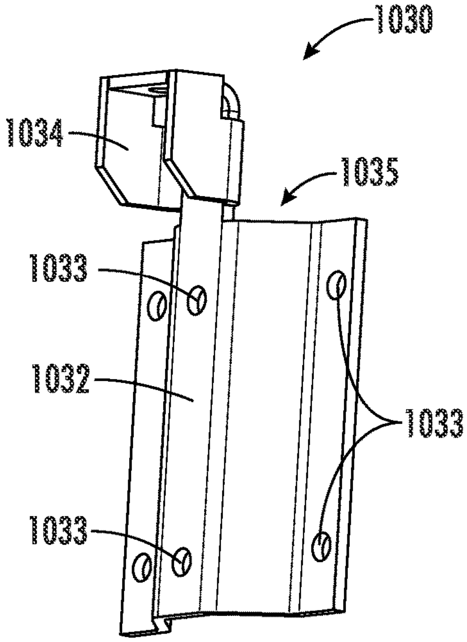
FIGS. 22A-22C are perspective views of the removable adapter of FIGS. 21A-21B.
Figure 22B:
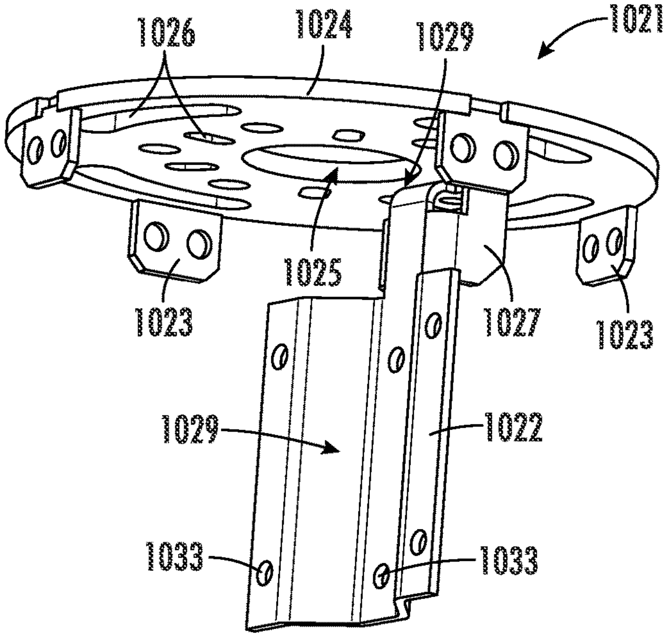
Figure 22C:
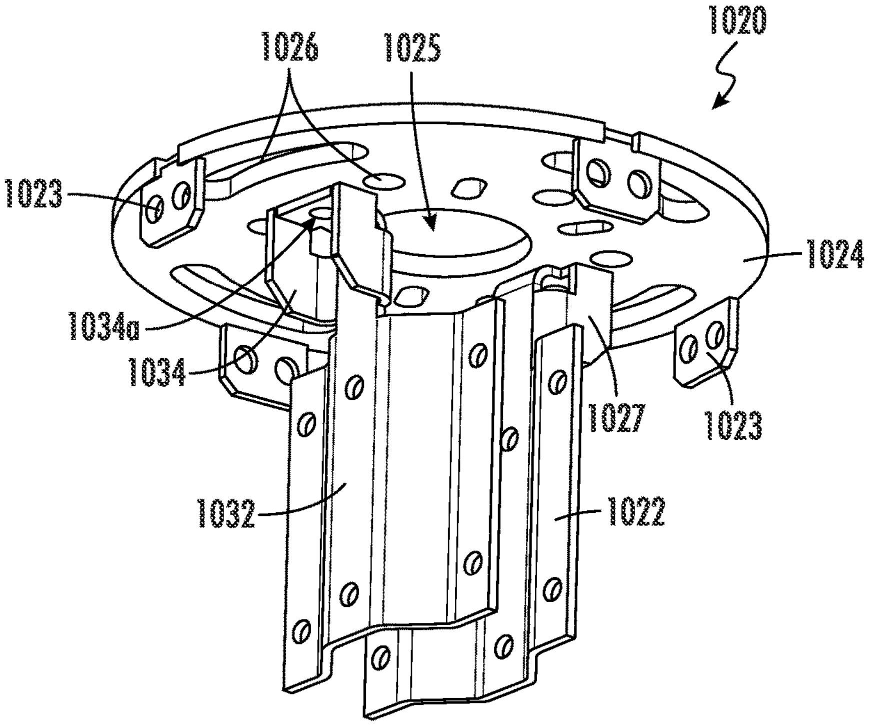

As shown in FIGS. 22A-22C, similar to the adapters 420, 620, 720, 820, 920 described herein, adapter 1020 includes a first weldment 1021 and a second weldment 1030. The first weldment 1021 comprises a clamp section 1022 and a top plate 1024 extending radially outwardly from the clamp section 1022. In some embodiments, the clamp section 1022 may be permanently assembled (e.g., welded) to the top plate 1024. In some embodiments, as discussed below, the clamp section 1022 may be fastened (e.g., bolted) to the top plate 1024.

Figure 21B:
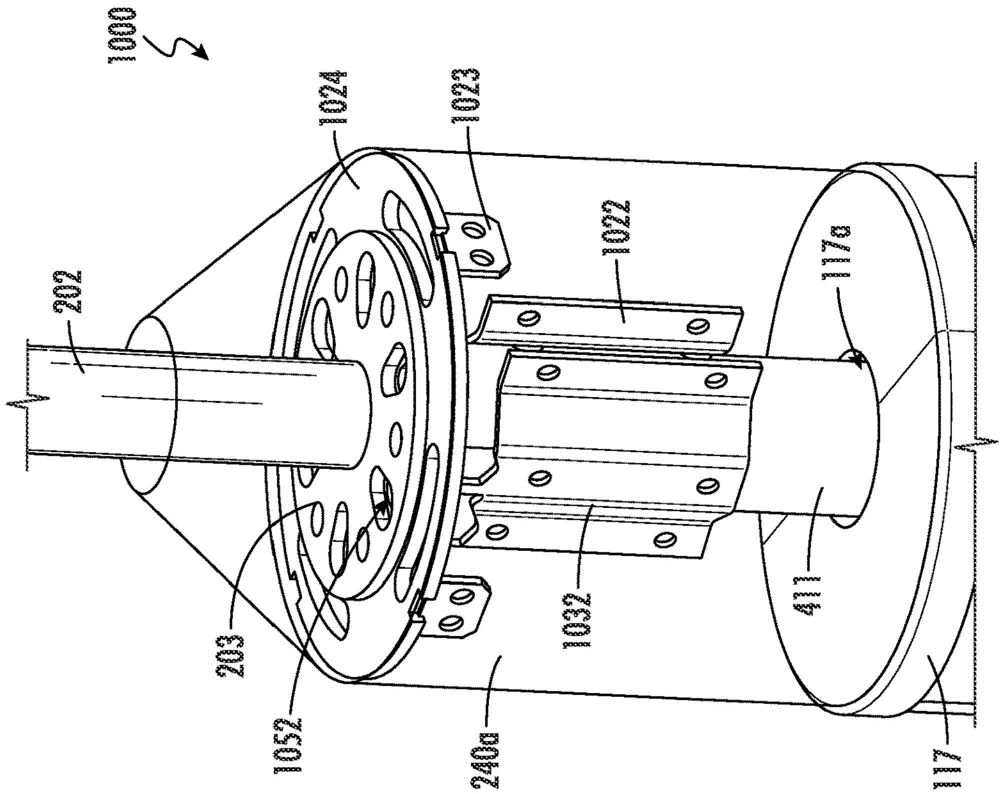
FIG. 21B is a top perspective view of the alternative removable adapter of FIG. 21A.
Figure 21A:
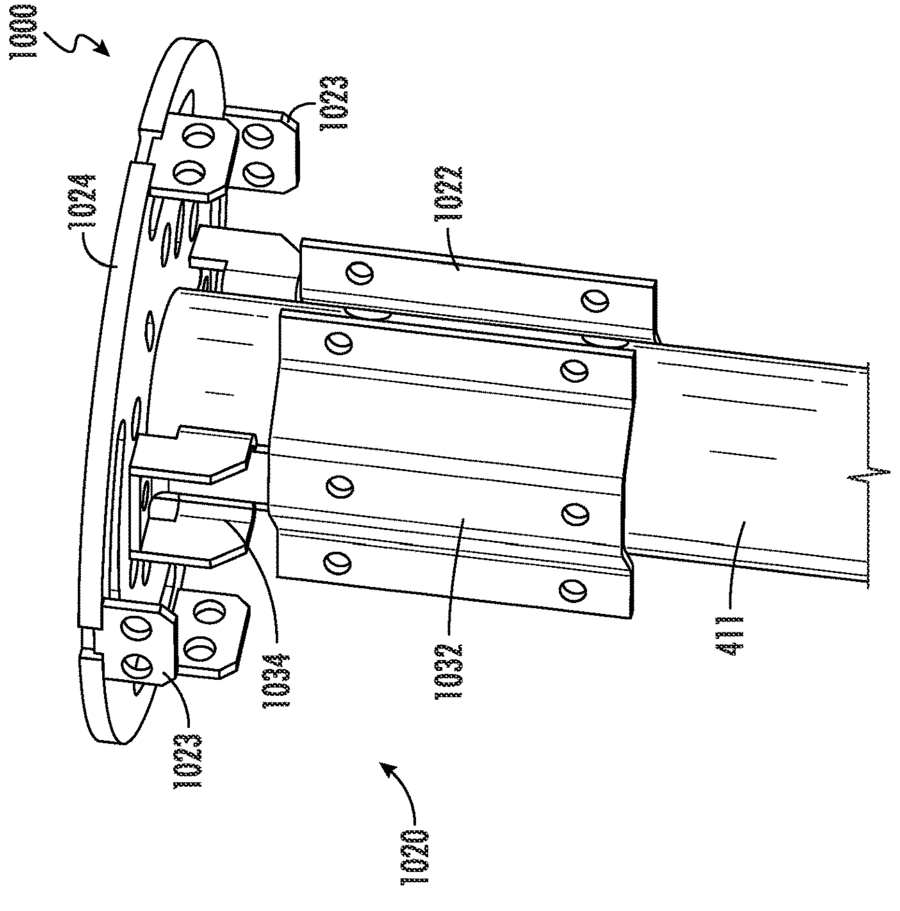
FIG. 21A is an enlarged bottom perspective view of the alternative removable adapter for the antenna mount of FIG. 20A.

The sides of the clamp section 1022 may be bent slightly inwardly to form a recess 1029 configured to engage the outer surface of the central spine 411 of the antenna module 410 (i.e., matches and locates to the outer diameter of the spine 411). Similarly, the second weldment 1030 comprises a clamp section 1032 having sides bent slightly inwardly to form a corresponding recess 1035 configured to engage the opposing outer surface of the central spine 411. As shown in FIGS. 21A-21B, the clamp sections 1022, 1032 of the first and second weldments 1021, 1030 are configured cooperate with each other to secure the adapter 1020 to the central spine 411 of the antenna module 210, 410.

In some embodiments, the second weldment 1030 comprises a flange 1034 extending from the clamp section 1032. The flange 1034 has an aperture 1034*a* configured to receive a fastener 1052 such that the second weldment 1030 may be secured to the top plate 1024 of the first weldment 1021. In some embodiments, the clamp section 1022 of the first weldment 1021 may also comprise a flange 1027 having an aperture 1027*a* configured to receive a fastener 1052 that secures the clamp section 1022 of the first weldment 1021 to the top plate 1024.

In some embodiments, the top plate 1024 of the first weldment 1021 further comprises a central aperture 1025. The central aperture 1025 is configured to align with the central spine 411 such that power cords/cables extending up through the central spine 411 may be routed through the central aperture 1025 and into the arm 202 of the luminaire unit 201 to be connected with mating power cords of the luminaire 204. In some embodiments, the top plate 1024 may comprise a lip (or shoulder) 1029 between the central aperture 1025 and the clamp section 1022. The lip 1029 is configured such that the top plate 1024 may sit on top of the central spine 411 when the adapter 1020 is secured to the antenna module 410. In some embodiments, the top plate 1024 may further comprise one or more flanges 1023 extending from the top plate 1024 that are configured such that a top concealment cover 240*a* may be secured to the adapter 1020 (see, e.g., FIGS. 20B and 21B).

After the recesses 1029, 1035 of the clamp sections 1022, 1032 are positioned against (engaged with) the outer diameter of the central spine 411, vertically oriented fasteners (e.g., top bolts) 452 may be used to secure the second weldment 1030 to the first weldment 1021 (see, e.g., FIGS. 21A-21B and FIG. 22C), thereby securing the adapter 1020 to the antenna module 410. In some embodiments, each of the clamp sections 1022, 1033 may further comprise a plurality of apertures 1033. In some embodiments, one or more of the apertures 1033 may reside on the sides of the clamp sections 1022, 1032 and be configured to receive a clamp bolt (not shown). One or more clamp bolts may be used to lock the weldments 1021, 1030 together radially through corresponding apertures 1033 in each clamp section 1022, 1033. In some embodiments, one or more of the apertures 1033 may reside in the center of the clamp sections 1022, 1032 and configured to receive a through bolt 450. One or more through bolts 450 may be used to lock both weldments 1021, 1030 of the adapter 1020 radially through the central spine 411 of the antenna module 410.

Figure 23A:
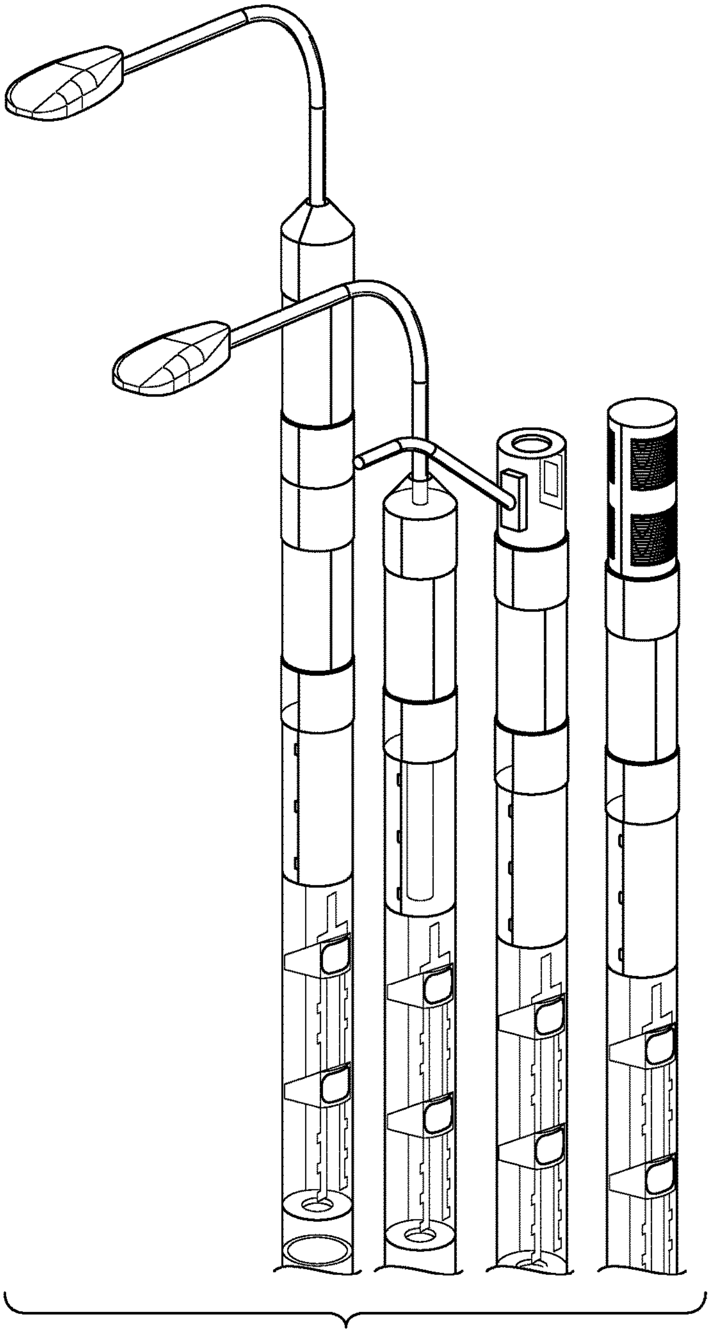
FIG. 23A is a perspective view of antenna mount assemblies illustrating exemplary equipment that may be mounted above the antenna mount according to embodiments of the present invention.
Figure 23B:
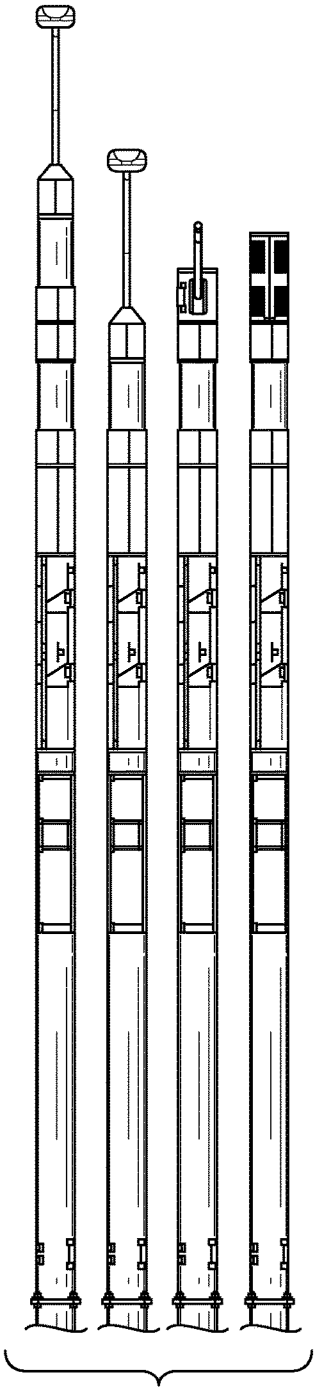
FIG. 23B is a front view of the antenna mount assemblies of FIG. 23A.

The antenna mount assemblies described herein may be configured to accommodate different configurations. FIGS. 23A-23B illustrate exemplary equipment configurations that may be utilized with antenna mount assemblies of the present invention such as from left to right: a dual stacked "pass through" antenna, a single stacked "pass through" antenna, a traditional luminaire arm, and a standard 12-inch pole top. Other configurations may be accommodated.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An antenna mount assembly, the assembly comprising:

an antenna module configured for mounting an antenna having a center through-hole, the antenna module including a pole top mount plate and a central spine coupled to the pole top mount plate and extending upwardly therefrom; and a removable adapter configured to be secured to an upper end of the central spine, the removable adapter comprising:

a first clamp member including a first partial tubular section and a top plate that extends radially outwardly from the first partial tubular section, the top plate including a plurality of mounting holes;

a second clamp member including a second partial tubular section and a flange, wherein the flange is configured to be secured to the top plate by a fastener; and a locking mechanism configured to draw the first and second clamp members together to secure the clamp members to the central spine of the antenna module;

wherein the locking mechanism comprises:

a first ramp member extending downwardly from the top plate of the first clamp member; and a second ramp member coupled to the second clamp member and configured to mate with the first ramp member, wherein the second ramp member is configured to slide against the first ramp member as the fastener is tightened such that the first and second partial tubular sections move toward each other to engage central spine and secure the removable adapter to the antenna module, a first ramp member extending downwardly from the top plate of the first clamp member; and a second ramp member coupled to the second clamp member and configured to mate with the first ramp member, wherein the second ramp member is configured to slide against the first ramp member as the fastener is tightened such that the first and second partial tubular sections move toward each other to engage central spine and secure the removable adapter to the antenna module.

2. The antenna mount assembly of claim 1, wherein the locking mechanism comprises one or more link assemblies that mate the first and second clamp members together.

3. The antenna mount assembly of claim 2, wherein the one or more link assemblies include one or more pivoting links connecting the first and second clamp members via retaining pins.

4. The antenna mount assembly of claim 1, wherein the locking mechanism comprises:

one or more radially-extending bolts; and a threaded mounting block extending downwardly from the top plate of the first clamp member, the threaded mounting block including one or more apertures configured to receive the one or more radially-extending bolts, wherein the one or more radially-extending bolts is configured to clamp the first and second clamp members to the central spin.

5. The antenna mount assembly of claim 1, wherein the locking mechanism comprises a cam assembly configured to clamp the first and second clamp members to the central spine.

* * * * *